US007366546B2

(12) United States Patent
Grossman et al.

(10) Patent No.: US 7,366,546 B2
(45) Date of Patent: Apr. 29, 2008

(54) SPORTS CHANNEL

(75) Inventors: Joel K. Grossman, Seattle, WA (US);
Albert W. Tan, Redmond, WA (US);
Paul J. VanderSpek, Seattle, WA (US);
Yingli Wang, Issaquah, WA (US);
Keith Curtis, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 372 days.

(21) Appl. No.: 10/857,556

(22) Filed: May 28, 2004

(65) Prior Publication Data
US 2005/0266793 A1    Dec. 1, 2005

(51) Int. Cl.
*H04M 1/00* (2006.01)

(52) U.S. Cl. ............... 455/566; 455/414.1; 455/414.3; 455/3.01; 455/550; 455/412; 340/7.52

(58) Field of Classification Search ............... 455/566, 455/414.1, 414.3, 3.01, 550, 412; 340/7.52
See application file for complete search history.

(56) References Cited

U.S. PATENT DOCUMENTS

| | | | |
|---|---|---|---|
| 5,442,646 A | 8/1995 | Chadwick et al. ............ 714/795 |
| 5,854,985 A | 12/1998 | Sainton et al. ............ 455/553.1 |
| 6,014,606 A | 1/2000 | Tu ............................. 701/200 |
| 6,212,414 B1 | 4/2001 | Alameh et al. ............ 455/575.6 |
| 6,272,332 B1 * | 8/2001 | Matsumoto et al. ....... 455/412.1 |
| 6,363,419 B1 | 3/2002 | Martin, Jr. et al. ........... 709/219 |
| 6,373,374 B1 | 4/2002 | Siemens ................... 340/309.8 |
| 6,480,783 B1 | 11/2002 | Myr ............................. 701/117 |
| 6,703,930 B2 | 3/2004 | Skinner ..................... 340/539.11 |
| 6,853,911 B1 | 2/2005 | Sakarya ........................ 701/208 |
| 6,879,847 B1 | 4/2005 | Kato et al. .................... 455/566 |
| 6,973,318 B2 | 12/2005 | Jambhekar et al. ........ 455/456.1 |
| 2002/0058520 A1 | 5/2002 | Nakagawa .................. 455/456 |
| 2002/0090934 A1 | 7/2002 | Mitchelmore ............... 455/412 |
| 2002/0142268 A1 | 10/2002 | Dutta et al. ................. 434/106 |
| 2002/0160805 A1* | 10/2002 | Laitinen et al. ............. 455/550 |
| 2003/0069029 A1 | 4/2003 | Dowling et al. ............ 455/456 |
| 2003/0228910 A1 | 12/2003 | Jawaharlal et al. ........... 463/42 |
| 2004/0021555 A1* | 2/2004 | Faris ........................... 340/7.52 |

(Continued)

OTHER PUBLICATIONS

D. Burke, "The FM Wristwatch Radio", http://www.nvg.ntnu.no/Sinclair/radiowat.htm, last accessed Jul. 11, 2001, 1 page.

(Continued)

*Primary Examiner*—Lester G. Kincaid
*Assistant Examiner*—Charles Shedrick
(74) *Attorney, Agent, or Firm*—Merchant & Gould P.C.

(57) ABSTRACT

The present invention provides a sports channel that includes sports content to a user on a mobile device. Sports content associated with the sports channel is automatically delivered and stored on a mobile electronic device for access by a user. Using the device, users can quickly access the sports information they are interested in without having to type in information to specifically download the content to the device. The sports channel is directed at providing a quicker and less cumbersome way of accessing sports information as compared to having to access a web site or a telephone service. Several different modes for categorically displaying different types of sports information is provided. Some example modes include: a games mode; a standings mode; and a news mode.

22 Claims, 21 Drawing Sheets

U.S. PATENT DOCUMENTS

| | | | |
|---|---|---|---|
| 2004/0043760 A1 | 3/2004 | Rosenfeld et al. | 455/413.3 |
| 2004/0203674 A1 | 10/2004 | Shi et al. | 455/415 |
| 2004/0204143 A1 | 10/2004 | Chen | 455/566 |
| 2004/0224662 A1 | 11/2004 | O'Neil et al. | 455/408 |
| 2005/0221821 A1 | 10/2005 | Sokola et al. | 455/432.3 |
| 2006/0063567 A1 | 3/2006 | Grossman et al. | 455/566 |

OTHER PUBLICATIONS

S. Reedy, "Sinclair Watch Radio", http://www.somerset.net/arm/transistors/Sinclair.html, last accessed Jul. 11, 2001, 4 pages.

Ambient Devices, http://www.ambientdevices.com/cat/platform.html, last accessed Sep. 5, 2002, 2 pages.

Ambient Devices, http://www.ambientdevices.com/cat/applications.html, last accessed Sep. 5, 2002, 3 pages.

E. Mueller, "A Calendar with Common Sense", ACM 2000, pp. 198-201.

B. Azvine et al., "The Intelligent Assistant: An Overview", Intelligent Systems and Soft Computing, LNAI 1804, Springer-Verlag, 2000, pp. 215-238.

T. Payne et al., "Calendar Agents on the Semantic Web", IEEE Intelligent Systems, May-Jun. 2002, 5 pgs.

S. Nylander et al., "Providing Device Independence to Mobile Services", User Interfaces for All, LNCS 2615, Springer-Verlag, 2003, pp. 465-473.

M.T. Raghunath et al., "User Interfaces for Applications on a Wrist Watch", Springer-Verlag, Personal and Ubiquitous Computing, vol. 6, 2002, pp. 17-30.

S. Mann, "'Smart Clothing': Wearable Multimedia Computing and 'Personal Imagining' to Restore the Technological Balance Between People and Their Environments", ACM Multimedia, 1996, pp. 163-174.

S. Barnes et al., "Rising Sun: iMode and the Wireless Internet", Communications of the ACM, vol. 46, No. 11, Nov. 2003, pp. 79-84.

A. Adya et al., "Characterizing Alert and Browse Services for Mobile Clients", Microsoft Research, 14 pages.

S. Acharya et al., "Balancing Push and Pull for data Broadcast", Proceedings of ACM SIGMOD Conference, May 1997, pp. 1-12.

A. Caraniga et al. "Content-Based Networking: A New Commmunication Infrastructure", Dept. of Computer Science, University of Colorado, 9 pages.

P. Tarasewich et al., "Issues in Wireless E-Commerce", ACM, 5 pages.

C.H. Leung et al., "Analysis of Mobile Commerce Market in Hong Kong", ACM, ICEC 2003, pp. 408-412.

G. Samaras et al., "Personalized Portals for the Wireless User Based on Mobile Agents", WMC '02, Sep. 28, 2002, pp. 70-74.

Timex—Data Link, http://www.timex.com/html/data_link.html, last accessed Sep. 8, 2004,.

Traffic Gauge (tm) Mobile Traffic Map, http://www.trafficgauge.com/, last accessed Sep. 8, 2004, 2 pages.

ESPN.com, http://sports.espn.go.com/ncf/scoreboard, last accessed Dec. 16, 2004, 8 pages.

Free Daily Overview Horoscope, Astrology.com, http://horoscope.astrology.com/dailysagattarious.html?arrivalSA=1&cobrandRef=0&arriv. . . , last accessed Dec. 16, 2004, 3 pages.

MSN Money—Financial Site, http://moneycentral.msn.com/home.asp, last accessed Dec. 16, 2004, 2 pages.

Yahoo Finance, http://finance.yahoo.com, last accessed Dec. 16, 2004, 3 pages.

AT&T Wireless, http://www.attwireless.com/personal/features/mmode/mmodeguide/content.jhtml, last accessed Dec. 16, 2004, 8 pages.

Moviefone: Who is Mr. Moviefone, http://movies.channel.aol.com/franchise/reeldeal/mmoviefonbio.adp, last accessed Dec. 16, 2004, 4 pages.

AvantGo, Inc., http://www.avantgo.com/frontdoor/learn_more.html, last accessed Dec 16, 2004, 3 pages.

MSN Mobile, http://mobile.msn.com/ac.aspx?cid=uuhp_alerts, last accessed Dec. 16, 2004, 2 pages.

AccuWeather, http://www.accuweather.com/adcbin/public/index.asp?partner=accuweather, last accessed Dec. 16, 2004, 3 pages.

weather.com, http://www.weather.com/weather/local/98101?lswa=98101&1wse= WeatherLocalUndecla..., last accessed Dec. 16, 2004, 4 pages.

Yahoo! Mobile, http://mobile.yahoo.com/?nosplash=1, last accessed Dec. 16, 2004, 2 pages.

* cited by examiner

| 1002 | 1004 | 1006 | 1008 | 1010 | 1012 |
|---|---|---|---|---|---|
| SEAHAWKS<br>1ST PLACE<br>(8 - 8 - 0)<br>2ND: CHI (12-3-2) | DUCKS<br>1ST PLACE<br>(49 PTS)<br>2ND: PHI (45 PTS) | MARINERS<br>1ST PLACE<br>(27 - 24)<br>2ND: NYY (5 GB) | LAKERS<br>1ST PLACE<br>(92 - 33)<br>2ND: CHI (4 GB) | MARINERS<br>T-1ST PLACE<br>(27 - 24)<br>TIED WITH: NYY | NCAA<br>MEN'S FOOTBALL<br>1 MIAMI (42)<br>12-2 \| PREV: 1<br>2 OHIO (5)<br>12-2 \| PREV: 2 |
| RAIDERS<br>3RD PLACE<br>(8 - 12 - 1)<br>1ST: SEA (8-8-0) | OILERS<br>3RD PLACE<br>(82 PTS)<br>1ST: ANA (101 PTS) | MARINERS<br>3RD PLACE<br>(4.5 GAMES BEHIND)<br>1ST: NYY (110 67) | PISTONS<br>3RD PLACE<br>(5 GAMES BEHIND)<br>1ST: LAL (92-33) | MARINERS<br>T-1ST PLACE<br>(27 - 24)<br>WITH: MULTIPLE | NCAA<br>MEN'S FOOTBALL<br>3 MINNESOTA 12-0<br>4 WASHINGTON 12-2<br>5 MISSOURI 11-0<br>24 PRINNETON 23-00 |
| RAIDERS<br>CLINCHED<br>PLAYOFF SPOT<br>(12 - 5 - 1)<br>2ND: CHI (11-9-4) | DUCKS<br>CLINCHED<br>PLAYOFF SPOT<br>(101 PTS)<br>1ST: CHI (103 PTS) | MARINERS<br>CLINCHED<br>DIVISION TITLE<br>(94 - 48)<br>2ND: CHI (2.5 GB) | LAKERS<br>CLINCHED<br>PLAYOFF SPOT<br>(5 GAMES BEHIND)<br>1ST: CHI (96-64) | MARINERS<br>T-3RD PLACE<br>(4.5 GAMES BEHIND)<br>1ST: BOS (110-67) | |
| RAIDERS<br>CLINCHED<br>PLAYOFF SPOT<br>(10 - 5 - 1)<br>1ST: CHI (12-5-2) | DUCKS<br>CLINCHED<br>PLAYOFF SPOT<br>(141 PTS)<br>2ND: PHI (111 PTS) | MARINERS<br>CLINCHED<br>PLAYOFF SPOT<br>(3.5 GAMES BEHIND)<br>1ST: CHI (111-64) | LAKERS<br>CLINCHED<br>DIVISION TITLE<br>(92 - 33)<br>2ND: CHI (5.5 GB) | | |
| | DUCKS<br>CLINCHED<br>DIVISION TITLE<br>(141 PTS)<br>2ND: PHI (111 PTS) | MARINERS<br>AL WILD CARD<br>3RD PLACE<br>(4.5 GAMES BEHIND)<br>T-1ST: MUL (110-67) | | | |

FIG.10

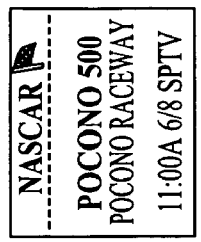
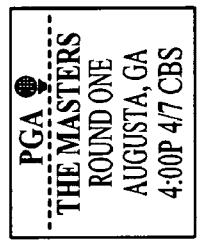
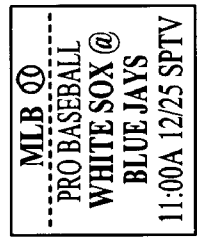
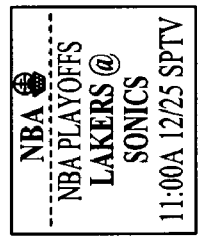
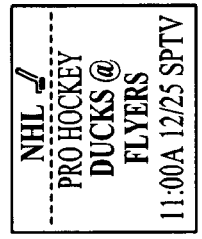
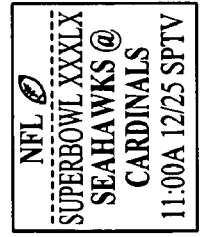
FIG.12

FIG.13

FIG. 15

| POST-GAME 🏀 | PTS | AST | RBD |
|---|---|---|---|
| LAKERS | | | |
| BRYANT | 24 | 16 | 20 |
| O'NEIL | 22 | 18 | 19 |
| FISHER | 16 | 10 | 16 |
| GEORGE | 12 | 9 | 12 |

| POST-GAME 🏀 | PTS | AST | RBD |
|---|---|---|---|
| SONICS | | | |
| RADMON | 18 | 13 | 22 |
| POTAPE | 16 | 10 | 18 |
| MURRAY | 13 | 8 | 15 |
| DROBNJA | 12 | 7 | 12 |

| POST-RACE 🏁 | |
|---|---|
| POCONO 500 | |
| 1 STEWART T | 20 |
| 2 MARTIN M | 6 |
| 3 EARNHARDT D JR | 8 |
| 17 ★LABONTE B | 18 |

| POST-GAME 🏈 |
|---|
| PRO FOOTBALL |
| SEAHAWKS WIN SUPERBOWL 17 IN 7 MINUTES OVERTIME. |

| POST-GAME 🏒 | G | A |
|---|---|---|
| SCORERS | | |
| DUCKS | | |
| P SYKORA | 25 | 56 |
| S RUCHIN | 34 | 25 |
| P KARLYA | 24 | 38 |

| POST-GAME 🏒 | G | A |
|---|---|---|
| SCORERS | | |
| FLYERS | | |
| M RECCHI | 7 | 3 |
| J ROENICK | 3 | 5 |

| POST-GAME 🏒 | |
|---|---|
| GOALIE STATS | |
| J GIGUERE | XX-XX |
| DUCKS | |
| T ESCHE | XX-XX |
| FLYERS | |

| POST-GAME ⚾ |
|---|
| DECISIONS |
| W: M JOHNS 11-23 |
| L: J H ROGER 11-13 |
| S: R MCDOUGL (23) |

*FIG.16*

SPORTS CHANNEL

BACKGROUND OF THE INVENTION

Mobile electronic devices, such as cell phones, wireless PDAs, wireless laptops and other mobile communication devices are making impressive inroads with consumers. Many of the mobile electronic devices are able to perform a variety of tasks and include a user interface to help the user access the features associated with the device. For example, some mobile devices include a display unit that displays graphical data to support email, instant messaging, web browsing, and other non-voice features. Using their mobile devices, users access the Internet, send and receive email, participate in instant messaging, and perform other operations. Accessing the desired information, however, may be cumbersome for the user. When accessing the Internet, for instance, users have to log onto the network and then type in information to access the information they desire. Additionally, using the user interface on the mobile device may be difficult. For instance, mobile devices typically do not have a good mechanism for inputting data.

SUMMARY OF THE INVENTION

The present invention is directed at providing a sports channel that includes sports content to a user on a mobile device.

According to one aspect of the invention, sports content associated with the sports channel is automatically delivered and stored on a mobile electronic device for access by a user. Using the device, users can quickly access the sports information they are interested in without having to type in information to specifically download the content to the device. The sports channel is directed at providing a quicker and less cumbersome way of accessing sports information as compared to having to access a web site or a telephone service.

According to another aspect of the invention, the sports channel includes several different modes for categorically displaying different types of sports information. Some example modes include: a games mode; a standings mode; and a news mode. The games mode is organized to display information relating to particular games or events on the electronic device. The standings mode is arranged to display standings information relating to particular sporting events. The news mode displays information relating to the current sports news.

According to yet another aspect of the invention, the user may customize the sports information they receive on their device. For example, using a web interface, the user may select teams or players to follow from a variety of sports.

A more complete appreciation of the present invention and its improvements can be obtained by reference to the accompanying drawings, which are briefly summarized below, to the following detailed description of illustrative embodiments of the invention, and to the appended claims.

BRIEF DESCRIPTION OF THE DRAWINGS

FIG. 10 illustrates exemplary standings views;

FIG. 12 illustrate upcoming sporting events;

FIG. 13 illustrates exemplary detail pre-game views for a games mode;

FIG. 15 illustrates exemplary final sporting event views;

FIG. 16 shows exemplary post-event coverage views;

DETAILED DESCRIPTION OF THE PREFERRED EMBODIMENT

Figure 1:
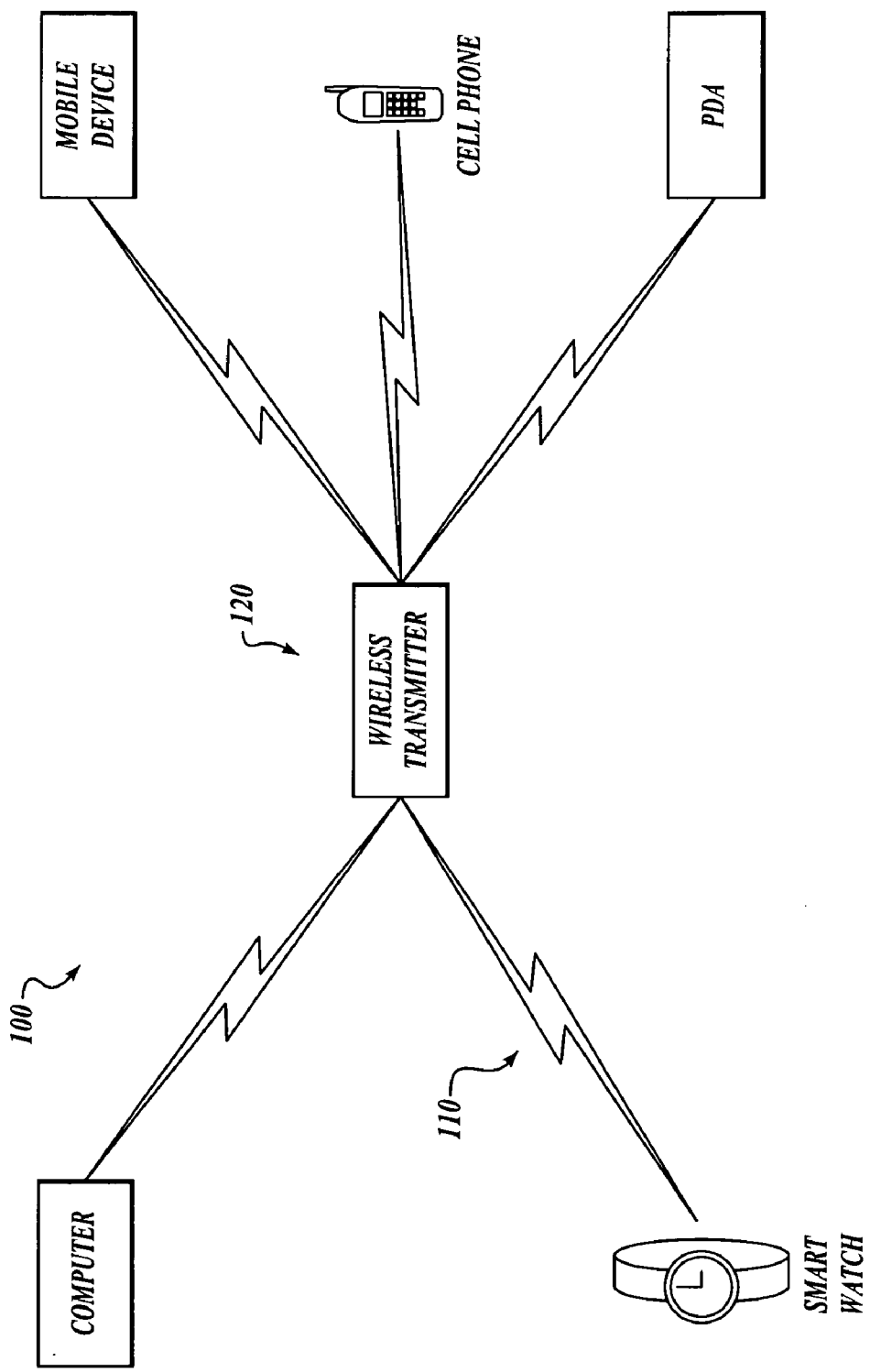
FIG. 1 illustrates an operating environment.

The apparatus, system, and method of the present invention are related to navigating through sports content on a device that includes stored sports related information. The sports content may be selected and viewed on a display of the device by means of passive interaction (e.g., hands free operation) or active interaction (e.g., selecting buttons).

In the described embodiments, the electronic devices may be mobile devices, such as smart watches, that are specially configured to receive communication signals. The electronic devices may be configured to receive broadcast transmissions from one or more broadcast towers and are capable of receiving and processing messages from the broadcast transmissions.

The electronic devices store the received information such that the information is indexed according to designated channels. Each channel includes content that is organized according to a set of criteria. For example, sports content is presented in one channel; wherein movie content is presented in another channel. Some channels may include content from one or more of the other channels. After information is received and processed by the client device, a user may passively or actively review the information that is stored in the electronic device.

One of the particular channels corresponds to a sports channel. The sports channel on each device may be customized based on user preferences such that the user experience is enhanced. An example sports channel may be configured to display sports content relating to certain teams and/or players that a user has selected or are located within their home region.

Although described here in the context of a watch-based system, other mobile or non-mobile devices, such as portable and desktop computers, personal digital assistants (PDAs), cellular telephones, and the like, may be used. The use of a watch is for illustrative purposes only to simplify the following discussion, and may be used interchangeably with "mobile device" and/or "electronic device".

The term "content" can be any information that may be stored in an electronic device. By way of example, and not limitation, content may comprise graphical information, textual information, and any combination of graphical and textual information. Content may be displayable information or auditory information. Auditory information may comprise a single sound or a stream of sounds.

Sports Channel

The sports channel is arranged to provide a user of a mobile electronic device simple access to sports information, such as game schedules, current game information, pre-game and post-game information, standings information; and sports news. The sports, teams, and players covered may be customized for each electronic device based on user preferences. The user preferences and sports information may be provided as information that is retrieved from broadcast transmissions such as described herein.

In team sports, users select teams to follow for all modes (games, standings, and news). For individual sports, the user may select individuals to follow. The user may select multiple teams or individuals in any given category of sports. When the user selects a team or individual, the user receives the games/events that this team or individual plays in and standings for the leagues that the team plays in.

Users are able to view sports information based on their preferences. According to one embodiment, a user may select a predetermined number of teams and/or individuals from various leagues and sports to cover. According to one embodiment, the user may choose to receive information relating to one or more of the following sports: football, basketball, baseball, hockey, auto racing, and golf. They may also choose teams on the college or pro level.

While using the sports channel, users automatically receive broadcast sports information, including game information (pre-game, current games, and post-game); standings information and sports news that are easy to navigate. For example, a user receives updated scores throughout games and can receive updates on trades, injuries, and other breaking sports news.

The user interface is directed at providing a simple, easy way to access the sports data that is pushed to the device. Updates to the event occur on the device as the events are happening. Additionally, the user can request only the teams/sports that they care about.

Exemplary Smart Object Device

Figure 2:
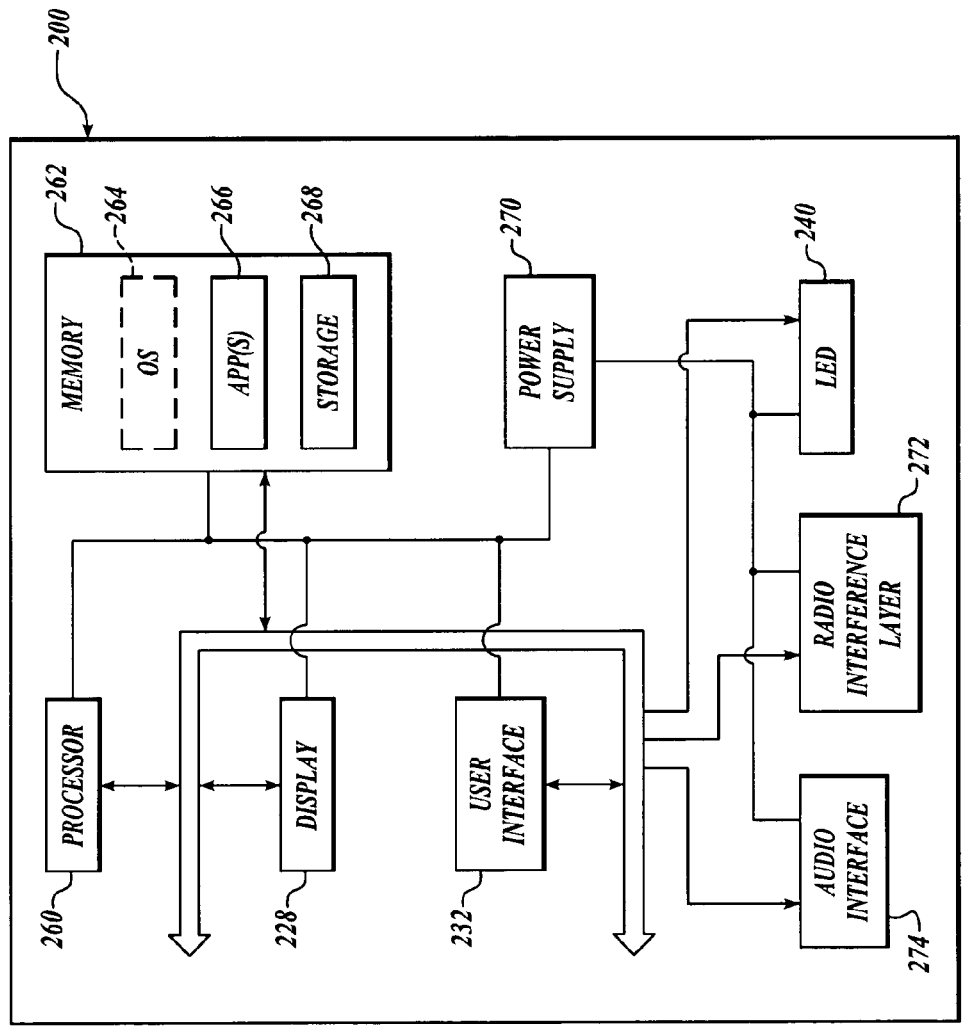
FIG. 2 shows an electronic device.
Figure 3:
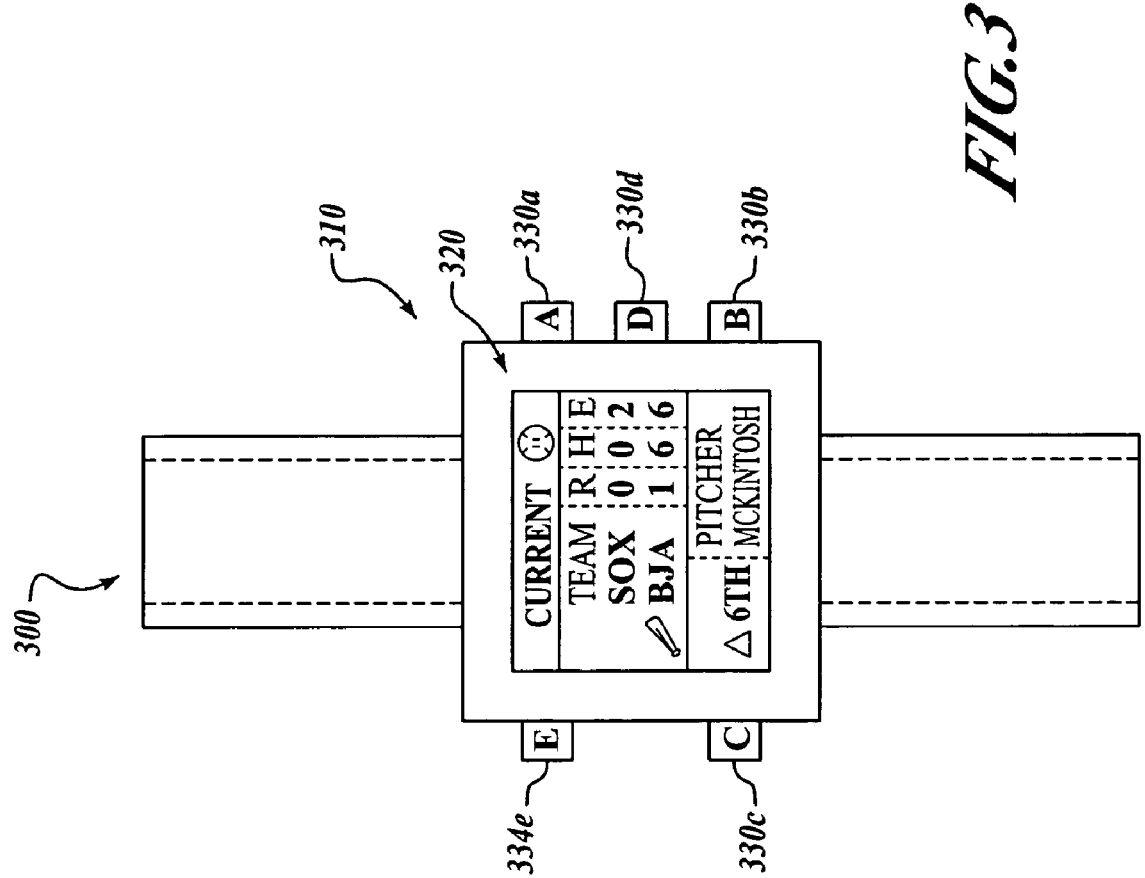
FIG. 3 illustrates an exemplary smart object watch devices that include a user interface for navigating through channels and content.

FIG. 3 illustrates an exemplary smart device that includes a user interface that is configured to interact with content from channels, in accordance with aspects of the invention. Watch device 300 includes bezel 310 which has an electronic system. The electronic system performs the functions in a manner that is consistent with the hardware that is described with respect to FIG. 2. Bezel 310 includes display 320, such as a liquid crystal display, a multiple bit display, or a full color display. In one embodiment, watch hands are electronically generated on display 320 when the user is in a time mode. In an alternative embodiment, the bezel includes analog-type watch hands that do not detrimentally interfere with display 320. As illustrated, display 320 shows a view in a sports channel for a baseball game that is currently in progress between teams of interest to the user.

Watch device 300 includes a series of selectors, such as buttons A-D (330*a-d*), which are arranged to operate as part of a user interface (UI). Each selector may have a default function and/or a context determined function. The currently selected channel determines the context for each selector. Alternatively, the currently active display may determine the context for each selector. For example, a display screen (e.g., a help screen) may be superimposed on the main display such that the display screen becomes the active context. Watch device 300 is context sensitive in that the function that is associated with each selector may change based on the selected channel or display screen.

Button "A" has a default function of page up or previous page in the currently selected channel. Button "A" may also have an alternate function based on the currently selected channel or display. Button "B" has a default function of page down or next page in the currently selected channel. Button "B" may also have an alternate function based on the currently selected channel or display. In one example, button "B" is activated for a predetermined time interval (e.g., two seconds) to select a "speed list browse" function.

Button "C" has a default function of next channel. Button "C" may also have an alternate function based on the currently selected channel or display. In one example, button "C" is activated for a predetermined time interval (e.g., two seconds) to select the main channel or "primary" channel. The main channel in an example watch device is the time channel that provides the user with time related information. However, devices may be configured to have some other display screen that is recognized by the device as a "primary" channel or "home" location.

Button "D" has a default (or "primary") function of "enter." The "enter" function is context sensitive and used to select the "enter" function within a selected channel (e.g., enter Game Mode), or to select an item from a selection list (e.g., select a game). Button "D" may also have an alternate function based on the currently selected channel or display. For example, the "D" selector is activated for a predetermined time interval (e.g., two seconds) to activate a delete function. In another example, the "D" button may be selected for a predetermined time to activate a help screen or an additional set mode. In this example, the help screen remains active while button "D" is activated, and the help screen is deactivated (e.g., removed from the display) when the "D" button is released. According to another embodiment, the "D" button may also perform another function; such as showing the date or time; initiating a custom action/animation; and the like.

The selectors are arranged such that the electronic device accomplishes navigating and selecting content on each channel in a simple manner. An optional fifth selector (e.g., button "E") may be arranged to provide other functions such as backlighting or another desired function. Other selectors may also be included.

Exemplary Sport Channel Modes

FIGS. 7-16 are diagrams illustrating example views for various modes associated with a sports channel that is arranged in accordance with the present invention.

Figure 7:
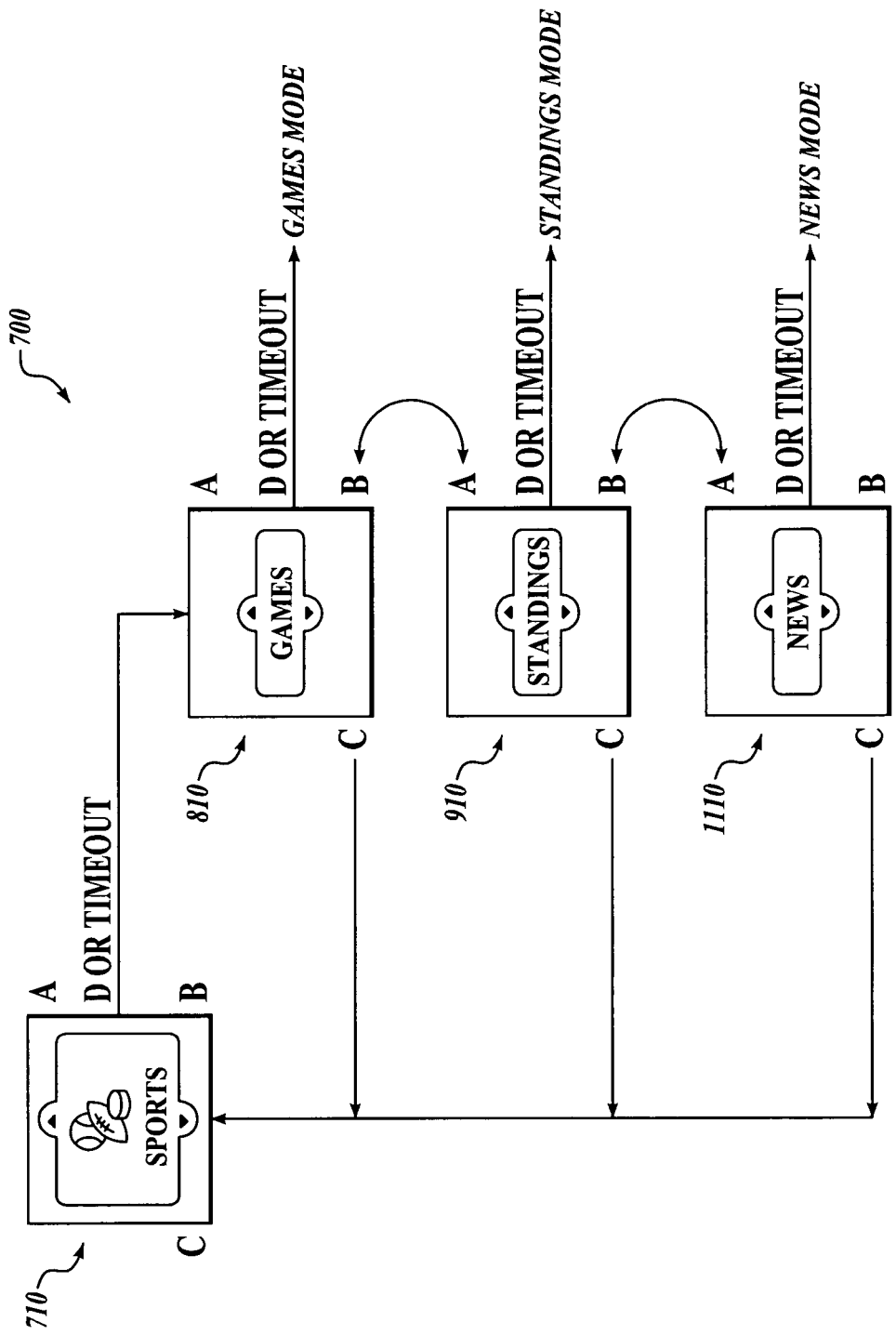
FIG. 7 illustrates exemplary modes for a sports channel.

FIG. 7 shows operating modes 700 associated with a sports channel, in accordance with aspects of the invention. The sports channel may be configured for multiple operating modes. According to one embodiment, the sports channel includes three modes: a games mode (810); a standings mode (910); and a news mode (1110).

Sports channel splash-screen 710 is displayed when the sports channel is initially selected. After the sports channel is selected, one of the available modes is activated by the expiration of a timeout period (e.g., two seconds) without user interaction, or by activation of the "D" or "enter" selector. The channel splash can be activated from any one of the mode splash screens by activation of the "C" selector.

A mode splash-screen may be displayed whenever the mode is changed on the device. In one example, the mode may be changed by selective activation of the next and previous selectors (e.g., the "B" and "A" buttons) when any mode splash screen is active. The mode splash screen may be dismissed via a timeout condition or by activation of the "D" selector (or enter function). Each mode has a series of associated views.

The channel splash-screen is dismissed after a mode is activated. When the game mode is activated, game splash screen 810 may be displayed. According to one embodiment, the device immediately enters the current game view mode without displaying splash screen 810. According to another embodiment, after the game mode splash-screen is dismissed, the device enters the current game view mode. Generally, the game mode of the channel includes many display views that correspond to pre-game information; current game information and post-game information relating to selected sports teams and/or players (See FIG. 8 and related discussion).

When the standings mode is activated, standings splash screen 910 is displayed. After the standings splash-screen is dismissed, the device enters the standings view mode. Generally, the standings view mode displays the current standings of a user's selected teams and/or players. A national ranking of teams may also be provided. (See FIGS. 9 and 10 and related discussion).

When the news mode is activated, news splash screen 1110 is displayed. After the news splash screen is dismissed, the device enters the news view mode. Generally, the news view mode provides the user with current sports news (See FIG. 11 and related discussion).

While in one of the sports modes, the user may select the "C" button to bring up the splash screen for the current mode. The user may then use the "A" or "B" buttons to move forward or backward through the available modes. The mode may be either selected actively by pressing the "D" button while the mode splash screen is being displayed or passively by waiting a predetermined period of time while the mode splash screen is being displayed.

Game Mode

Figure 8:
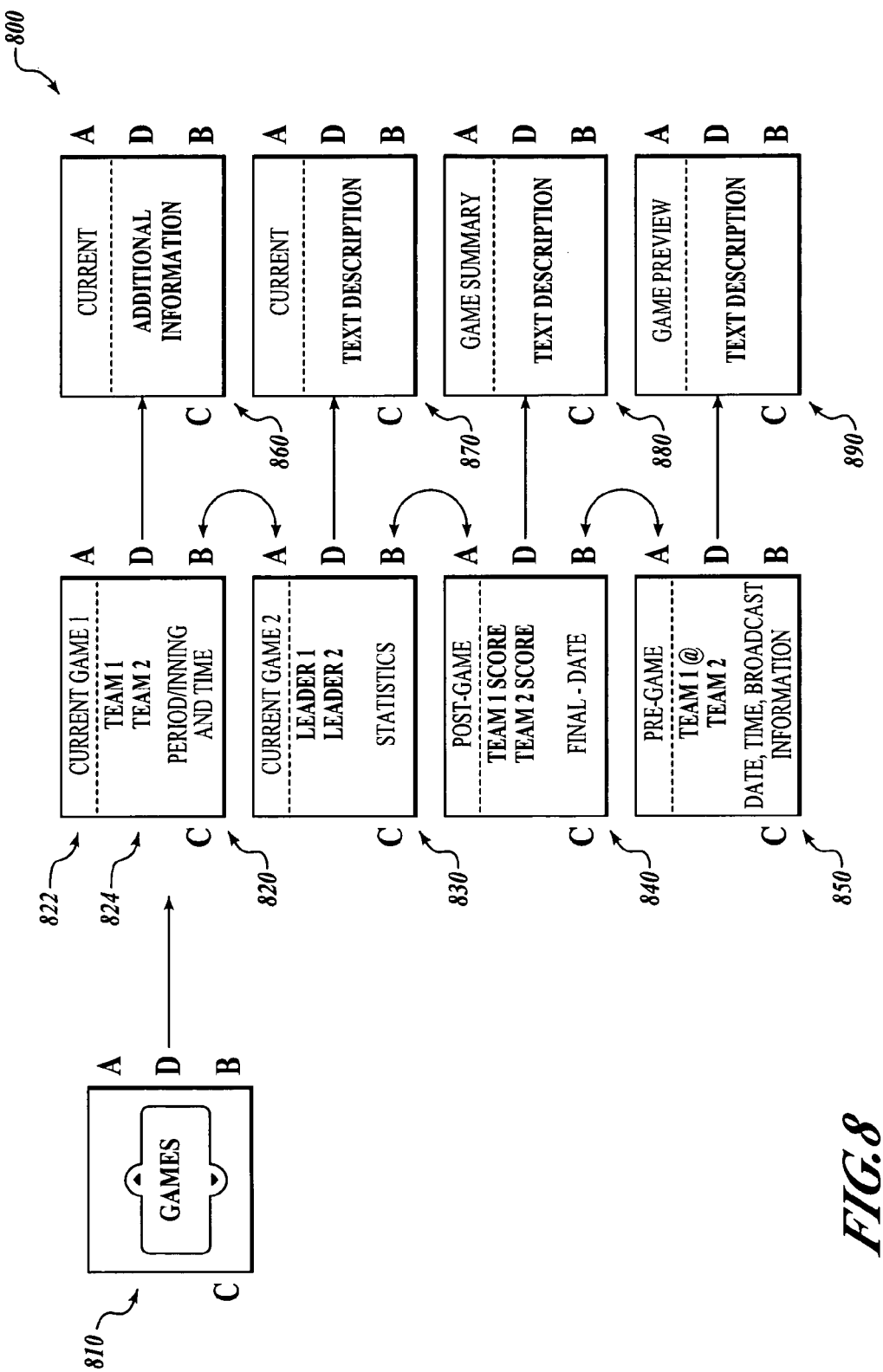
FIG. 8 illustrates a game view mode.

FIG. 8 illustrates a game view mode 800, in accordance with aspects of the invention. Generally, the game mode is the default mode for the sports channel and provides the user with game/event information for players/teams/leagues in which the user is interested. In the game mode, users can receive information on upcoming games; current games; and post-game summaries. Generally, pre-game information appears a few days before the start of the game and contains information relating to the upcoming event. When the event starts, the pre-game information is removed from the device and replaced with the live current event information. Once the game is complete, the current game information is replaced with post-game information that may remain on the device for several days. Each game view may be partitioned into a header section (822), and a main body section (824). The header section may display the title of the selected view, the current time or date, a team name(s); or some other information.

After a predetermined delay time, the header section of the display screen may change from the one header view to another header view. After another predetermined delay time, the header section of the display screen may change back to the first header view or some other header view.

While the user is in the game mode, the displays are clustered by the game type. The current game views are followed by post-game views which are followed by the pre-game views. According to one embodiment, within each game type (pre-game, current, and post-game), the views are clustered by league, in the following order: MLB; NBA; WNBA; Men's College Basketball; Women's College Basketball; NFL; College Football; and NHL. Other arrangements may also be used.

Within each game-type/league cluster, items are organized first by start time, then alphabetically by team name for the team that the user is tracking within each cluster. If the user is tracking two teams for the same game then the items are placed in order based on the first team, alphabetically and that game appears one time on the device. Activation of the previous and next selectors (e.g., the "A" and "B" buttons) allows the user to scroll through the different views available in the games mode.

Current Game View

The current game view (820 and 830) contains updates of the game or event as it is occurring. This view may include information such as the score of the game, the time remaining in the game, or any other relevant information depending on the particular sport/event being displayed. Depending on the sport, selecting the details button provides the user with some additional details (860 and 870) such as top fouls/scorers, scoring plays, current leader(s), and the like. The arrival of current game information causes the device to remove pre-game information from the device relating to the event. The arrival of post-game content causes the current game view to be removed from the device.

Post-Game View

The post game view (840) shows the last game/event for a particular team/sport to which the user subscribes. According to one embodiment, the post-game view is removed from the device after a predetermined period of time (i.e. 36 hours). According to another embodiment, the information is removed when a current game starts for the same team displayed in the post-game view. The post game view contains information relating to the final outcome of the game, such as the final score and some other statistics. For many sports, the user may select the "D" button (the detail view) which provides the user with a short game summary (880). The post game view may also display other information, such as if the event was rained out, delayed, and the like.

Pre-Game View

The Pre-Game view (850) includes information about the next game or event for a team or sport that the user has requested. For example, the pre-game view includes the teams playing, the time and date of the event and any broadcast information (i.e. what TV channel is broadcasting the game or event). Once the game starts, the pre-game information is replaced with the current game view.

If the details view (the "D" button) is selected, a pre-game details view (890) is displayed when available. The pre-game details view provides a more detailed view that shows the team names, with records and rankings (for college), or points and record for hockey. If there is no ranking or record (e.g. All Star teams), then these items are not shown.

This information may also be followed by a "news story" for the game if available. These are short stories which the user can read to obtain more details. For example, along with the pre-game news story, when the teams are baseball teams then the story may contain the starting Pitchers, their records and their ERA. The user can scroll through the news story by using the A and B selectors.

According to one embodiment, old content is automatically deleted from the device. Generally, the content is deleted: when the view is a pre-game view and the game started more than four hours ago and no current game update was received by the device. When the device receives a current game update the pre-game view is automatically removed.

Standings Mode

Figure 9:
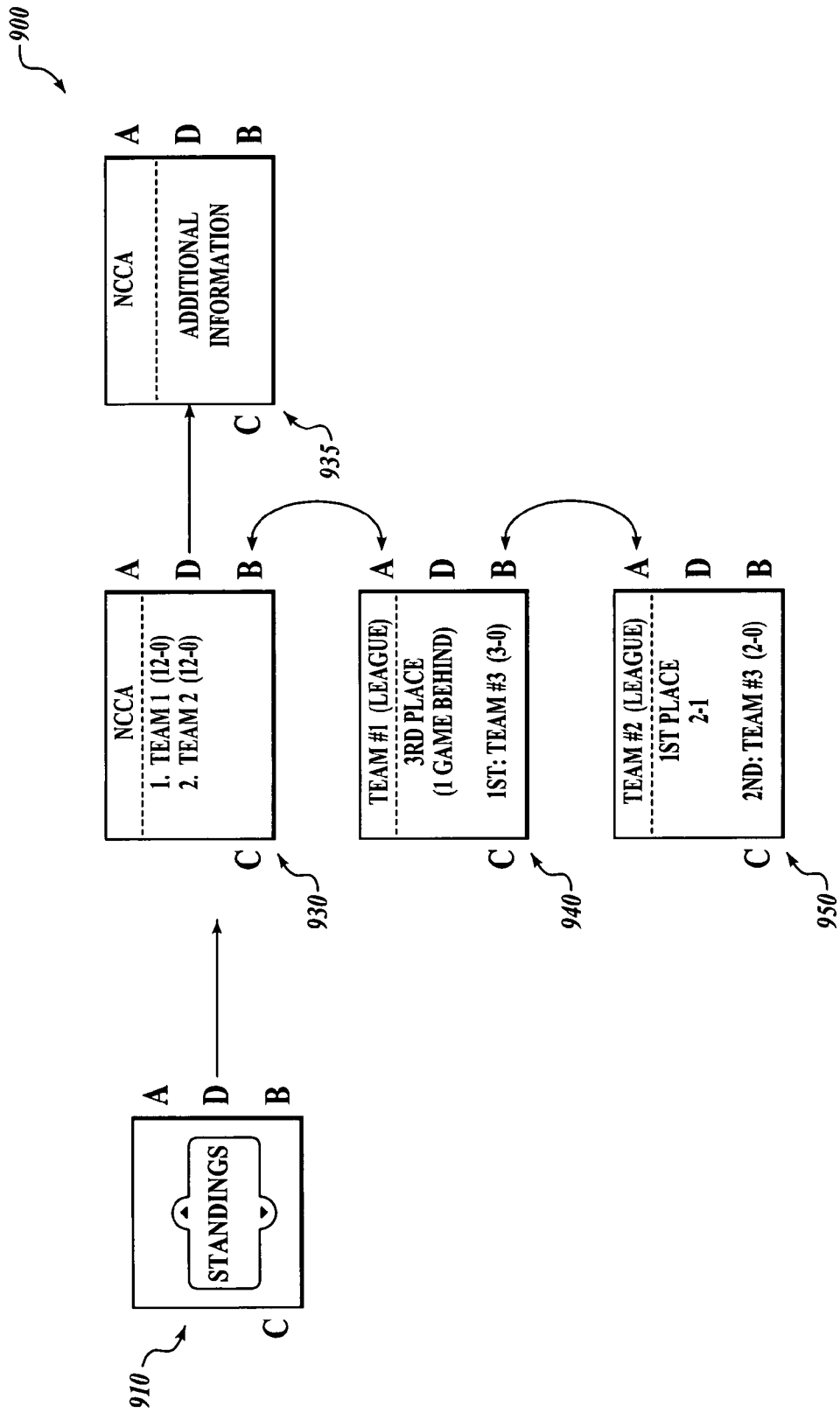
FIG. 9 illustrates a standings mode.

FIG. 9 illustrates a standings mode 900 for the sports channel, in accordance with aspects of the invention. The standings mode of the sports channel allows the user to view where the tracked teams/players stand in their respective leagues.

The standings mode includes a view which displays standings for the user's selected teams and or leagues. For college sports, the standings mode shows the national ranking of the team (930). The device shows the top 25 ranked teams for that sport. (According to one embodiment, if the user is subscribed to any college team, then the device shows the user the Top 25 teams for that sport, even if the user's team is not in the Top 25.

According to one embodiment, the standings view shows the team name, the team's place in their league, the number of games behind the first place team if the team is not in first place and/or the record (if in first place) or some other indication (940, 950). The view also shows the next-closest team in the standings. Additionally, the standings view also shows relevant standings-related information like "clinched division title" or "clinched playoff berth." A detail view may also be associated with a standings view (935) that provides the user with more information.

FIG. 10 illustrates exemplary standings views, in accordance with aspects of the invention. As can be seen by referring to the exemplary views the standings information displayed changes based on the particular sport being displayed. For example, for hockey the points are shown and for football the record is shown.

Views 1010 illustrate views when a team is tied with another team. If a team is tied for $1^{st}$ place the view shows "T-$1^{st}$ Place" and the bottom line of the view shows the other team(s) it is tied with ("Tied With:"). If a team is tied for a place other than $1^{st}$ place then the view shows "T-<place>" and the bottom line shows the first place team. If the team is not tied, but there is a tie for first then the bottom line of the view shows "T-$1^{st}$: mul (record)" Ties in the Standings Views 1002 show exemplary NFL standings view. As displayed, views 1002 include the place of the team and the team name, the team's record (W-L-T), whether the team has clinched a playoff spot or division title, the record for the $1^{st}$ place team if the user's team is not in first place or the record for the second place team if user's team is in first.

If the user is tracking multiple teams within one league, there is a single standings view screen for each team that the user is tracking. The screens are sorted in order by place and then alphabetically (i.e., all NFL teams are clustered together). Other standings views may also be displayed, including standings for NFL wild card, baseball wild card, and the like. Views 1004 illustrate NHL standings views. According to one embodiment, the hockey standings views show: the place of the team in their league and the team name; their points total (if in first place) or the number of points behind the points leader when the team is not in first place; whether the team has clinched a playoff spot or division title; an the next closest team, with their point total.

Views 1006 show exemplary baseball standings views. The baseball standings views show: the team name; their record (W-L) (if in first place); number of games behind (if not in first place); whether the team has clinched a playoff spot or division title; The first place team (with record) if the tracked team is not in first place, or the next closest team (with games behind) if the tracked team is in first place.

Wild Card standings may also be displayed. According to one embodiment, the wild card standings are presented towards the end of the baseball season. The Wild Card standings are identical to regular standings except that either "AL Wild Card" or "NL Wild Card" (for baseball) or "AFC Wild Card" or "NFC Wild Card" (for football) appears at the top of the standings:

Views 1008 illustrate exemplary NBA standings views. The basketball standings views show: the team name; their (W-L) (if in first place); number of games behind (if not in first place); and whether the team has clinched a playoff spot or division title.

Views 1012 illustrate exemplary standings views for college sports. If a user subscribes to any college football or Men's/Woman's Basketball teams, then that user will also receive the NCAA Top 25 for that sport's rankings. The college standings view shows the top two teams by name in order with their current ranking and previous week's ranking. Selecting the details button lists the top 25 teams.

Although views are not illustrated for every sporting event, standings views may be displayed for any other sports/events. For example, golf standings may show the Top 20 world rankings, dollar leaders, and the like. For auto racing, the top points leaders could be shown.

News Mode

Figure 11:
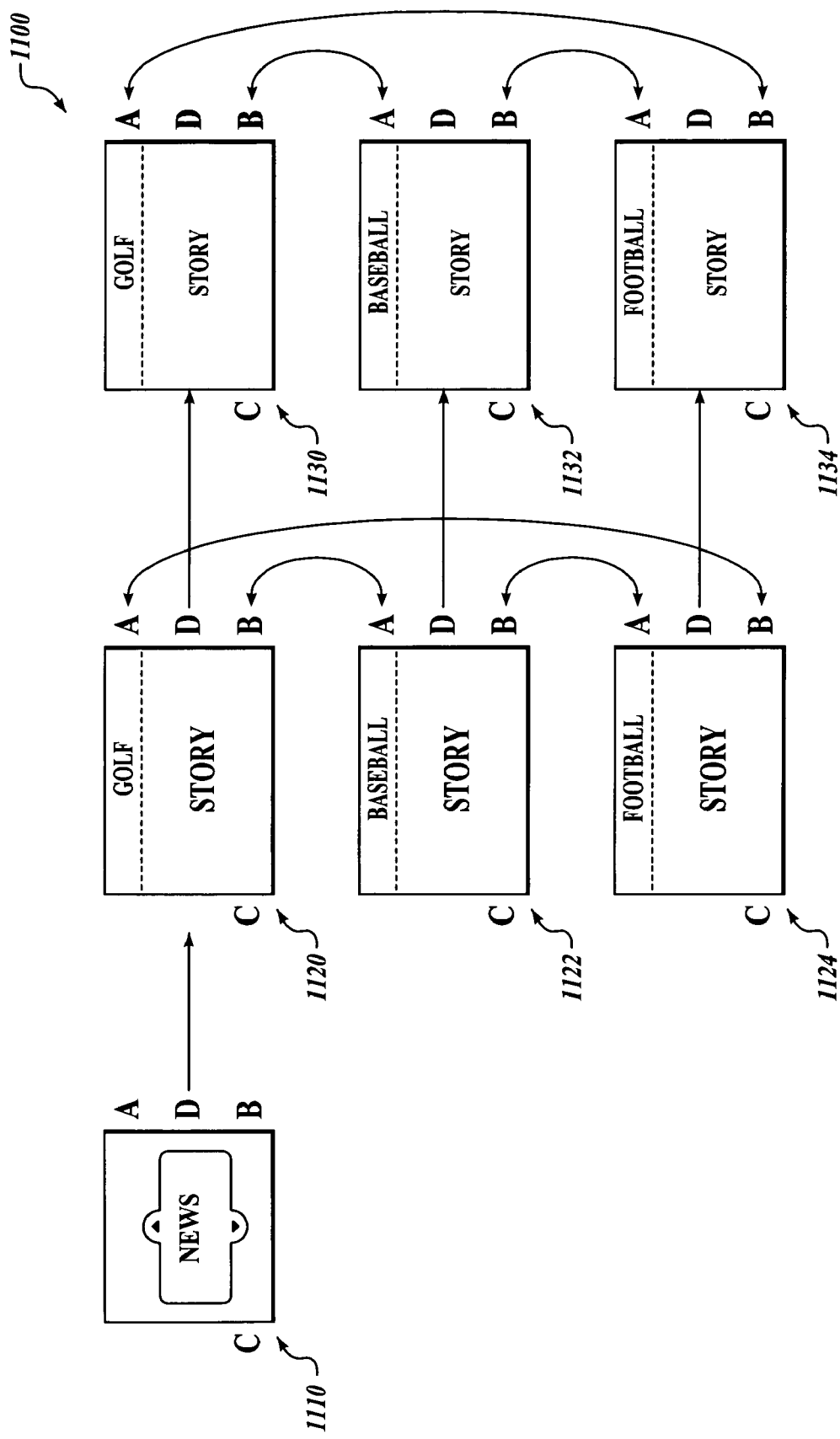
FIG. 11 shows a news mode.

FIG. 11 shows a news mode 1100 of a sports channel, in accordance with aspects of the invention. The news mode is designed to provide users with current sports news. The news mode is designed to show sports news items related to the teams and/or players that the user is tracking. This mode covers news items like trades, injuries, draft picks, general news for a team, and the like.

Selecting the news mode from screen 1110 provides the user with a headlines view for the news stories (1120, 1122, and 1124). The headline view shows the headline views for the current stories. If the user has not pressed any buttons for a predetermined time (e.g. 5 seconds), the watch begins to automatically cycle through the headline views. The user may also manually advance through the list by pressing the next or previous buttons.

The title bar of the view displays the team or sport that the news story relates to. The title bar may also display other information, such as time and date information. According to one embodiment, if the user stays on a single page in details mode of a sports channel news story for more than 10 seconds without pressing any button, the watch returns to glance mode for games and begins to auto-glance through that mode.

Selecting the "A" button navigates the user to the next headline. If the current headline is headline #1 and the user selects the "A" button, then the last headline is displayed.

Selecting the "B" button navigates the user to the next headline. If the device is currently displaying the headline and the user selects the "A" button, then the first headline is displayed.

Selecting the "D" button navigates the user to a detail view for the currently selected headline. For example, selecting the "D" button from display 1120 provides the user with detail view display 1130. Similarly, selecting the "D" button from 1122 provides the user with detail view 1132 and selecting the "D" button from view 1124 provides the user with detail view 1134. The detail view provides the user with access to the entire story. When the story extends beyond one screen, the user may then use the page up ("A")

or page down buttons ("B") to move through the story. When the user has reached the end or beginning of the story selecting the page up or page down button moves the user to the next news story in detail view. Holding down the "D" button for a predetermined period of time deletes the story from the device.

FIG. 12 illustrate upcoming sporting events, in accordance with aspects of the present invention. As illustrated, the views for sporting events in which the event is a game include the teams playing along with and indication of the home team and the away team; the start time and date; and broadcast information. When the sporting event is not a team event, then the views include the name of the event, along with the location, the time and date, and the broadcast information. If the game is one of a playoff series (i.e. NBA PLAYOFFS), then the series line may also be shown along with the current series score (e.g. BOS LEADS SERIES 2-1). Other information may also be cycled in the view.

FIG. 13 illustrates exemplary detail pre-game views for a games mode, in accordance with aspects of the present invention. Selecting the details button from an upcoming sporting event view provides the user with more details regarding the event. According to one embodiment, the details view includes items such as the sports teams playing, their records/rankings; starting pitcher information (ERA, record); and the like.

Figure 14:
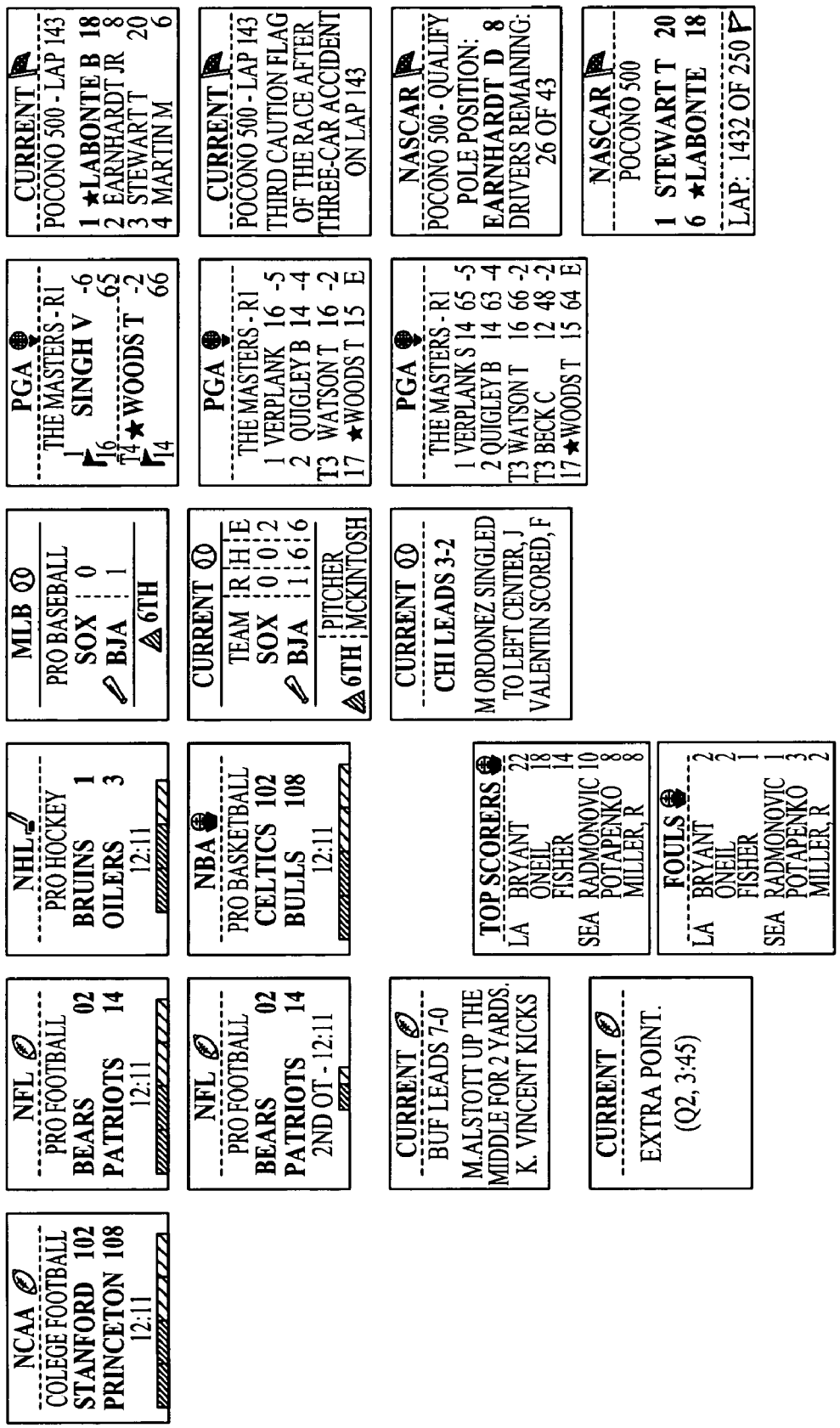
FIG. 14 shows exemplary detail views of sporting events in progress

FIG. 14 shows exemplary detail views of sporting events in progress, in accordance with aspects of the present invention. Generally, during the sporting event the device displays views that include the current score or leaders and time left. The sports content provided to the device is dependent upon the specific sporting event. For example, for football, the following current information may be provided: score; quarter; time remaining; possession; where the ball is/down/yards; scoring plays; and highlights. Baseball includes content such as: box score; inning; half-inning summary of plays; scoring plays; who is on base; who is pitching; who is batting; how many outs; and batters count (balls/strikes). Hockey includes items such as: score; who scored, who assisted; special circumstances, including power plays, short-handed; period, time; shots on goal, total shots on goal for the game (e.g., Flyers 6 shots on goals); power plays ("Flyers on Power Play."); penalty (e.g., "penalty to x for y and time left in the penalty) percentage of face-offs won by each team. For golf, the content may include items such as: top ten leaders with their current hole and score, as well as any information on a player the user is tracking. Auto racing includes items such as: leaders; number of laps completed; total laps; and the like.

A clock graphic is included for sports that are timed. For example, for pro hockey, the game consists of three 20-minute periods. Initially, the clock graphic is three grey rectangles. According to another embodiment, the clock graphic is a pie shape that is split into the number of periods for the event. As time elapses, an appropriate fraction of the blocks become black. For pro basketball, the game is divided into four 12 minute quarters. Initially, the clock graphic is four grey rectangles which are blackened appropriately as the time progresses. If the game enters an overtime, then the clock reformats itself accordingly. A text indicator also may be used to update the time remaining the game period. When a period is ended, the text represents this. When the game goes into overtime an appropriate description is provided.

If there's a score, the details view of the event may show a scoring summary (time of score, description, and new score). When there are multiple scoring plays in a game, they are presented in reverse chronological order.

For basketball, the first page of the details view shows the top three scoring leaders for each team including their name (team, abbr.) and points. The second page shows the top players in foul trouble. The title bar changes here to show "Top Scorers" and "Foul Trouble."

For golf, the current event view shows the event name, the round, and the top ten players on the leader board. The leader board data consists of the position, the player's last name (with initial if necessary), their score relative to par, and the hole they are on or have finished. Additionally, if the user's "favorite player" isn't listed by name, that player and their current place, score, and hole is listed.

For auto racing, the current event detail view for auto racing shows current top 10 with times (the leader shows "lap XX", all others show time behind the leader, like +0:32.30). Additionally, the placement of the user's "favorite racer" if that racer is not in the Top 10 is included in the display.

The baseball details view shows an extended scoreboard with runs, hits, and errors for each team. The view also shows the current pitcher, which team is batting, and the inning. If there's a score, the second page of the details view of the baseball game shows the scoring summary (inning and how the score happened). The new score begins each scoring summary in bold, as shown. When there are multiple scoring plays in a game, they are presented in reverse chronological order (newest report first). The user navigates through them like one continuous story (using the up and down arrows). Selecting the "D" button from any portion of the storing summary returns to the game view mode.

Figure 15:
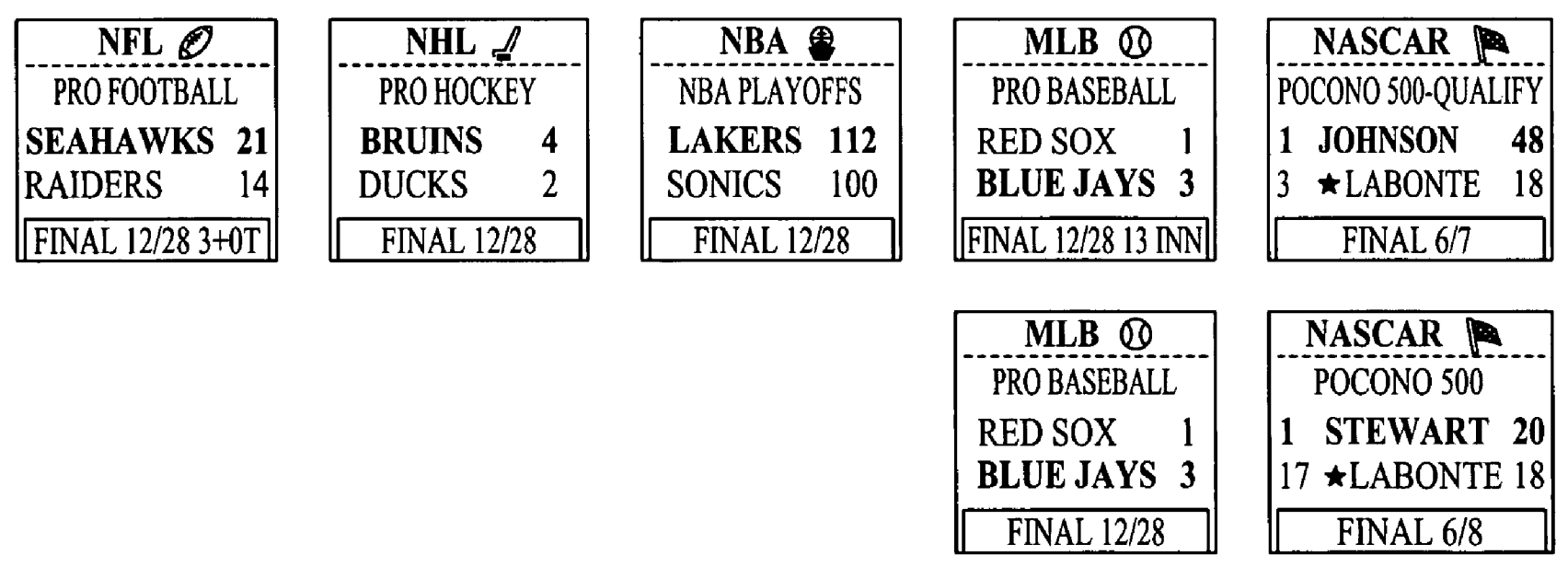

FIG. 15 illustrates exemplary final sporting event views, in accordance with aspects of the present invention. As illustrated, the views include an indication that the game is completed successfully or not (the game could have been cancelled, rained out, etc.); the date of the game; the team names; final score; and whether or not the game went into overtime. The losing team is grayed out. If the game completed was one of a Series (i.e. NHL PLAYOFFS), then the title line rotates in the series score (e.g. BOS LEADS SERIES 1-0). The post game content remains until the next game for the tracked team begins, or until two days after the game ended (whichever is shorter). The content may remain a longer or shorter period of time.

FIG. 16 shows exemplary post-event coverage views, in accordance with aspects of the present invention. Generally, the post-game coverage for football includes: team names with the final score; high passing (name and statistic); high rushing (name and statistic); high receiving (name and statistic); and attendance.

For baseball, the post-game summary may include content such as: final score; runs, hits, errors; winning pitcher; losing pitcher; saves; and home runs. For hockey, the post-game summary includes content such as: leading scorers; goalie stats; shots on goal; and the like.

Figure 17:
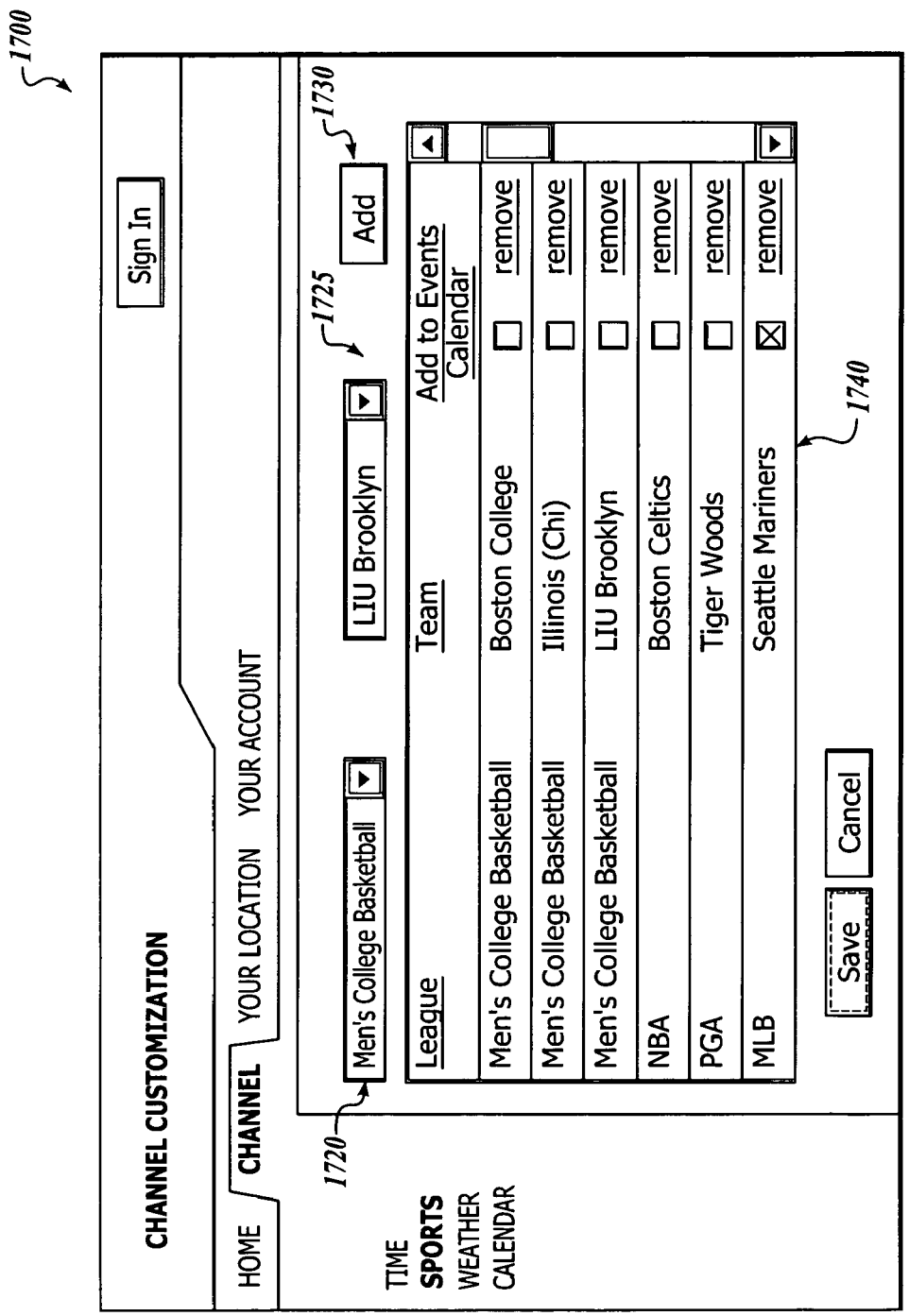
FIG. 17 illustrates a web user interface for inputting user preferences for a sports channel.

A "news story" for the game (if available) may also be displayed. These are similarly to the news stories in the news mode except that they are displayed without a headline User Interface for Selecting Events and Teams FIG. 17 illustrates a web user interface for inputting user preferences for a sports channel, in accordance with aspects of the invention.

Teams/Players/Events can be selected via a computer type interface such as through an internet based application, a computer based application, or any other reasonable method of accessing and altering configuration information. In one embodiment, a subscriber to the sports channel can accesses web page 1700 to select or change various features associated with the sports channel. In another embodiment, sports teams already being tracked on a user's Internet home page may be retrieved from the user's home web site and then used to populate the sports list (1740). List 1740 displays the teams that the user is subscribed to, grouped by sport. The sports are arranged in alphabetical order and then the teams are arranged in alphabetical order within each sport.

In another embodiment, when the user initially subscribes to the sports channel, the list of teams is populated with professional teams near the user's home area.

The user can change the league by selecting the league dropdown menu (1720). When the user selects a league, team dropdown list 1725 is populated with all of the teams and/or players within the selected league. According to one embodiment, teams within the following leagues may be selected: MLB; NBA; NCAA Men's Basketball; NCAA Women's Basketball; NCAA Football; NFL; NHL; WNBA; PGA; and NASCAR.

When a league and team are chosen, the user can select the "Add" button (1730) to add the team to list 1740. After the user adds a team, the newly added team appears in the list 1740.

When a user reaches a predetermined limit of teams the "Add" button (1730) is grayed out and text appears explaining that the number of teams selected is limited. According to one embodiment, the number of teams or players selected from each league is limited to five.

The user may also desire to add a sporting event to an events calendar such that the user will be notified about an upcoming sporting event. By checking the box under the "Add to Events Calendar" column a notification will be provided to the user of upcoming games.

When the user clicks on a "remove" link next to the team name, list 1740 refreshes and is displayed without that team. According to one embodiment, removing all of the teams from list 1740 and clicking "save" unsubscribes the user from the Sports channel. In this instance, a configuration message is sent to the device causing the sports channel content to be removed from the device.

According to one embodiment, when a user chooses to track a league they will also receive content for any special games for that league (i.e. All-Star games, playoff games, tournament games, etc.)

Encoding

Figure 18:
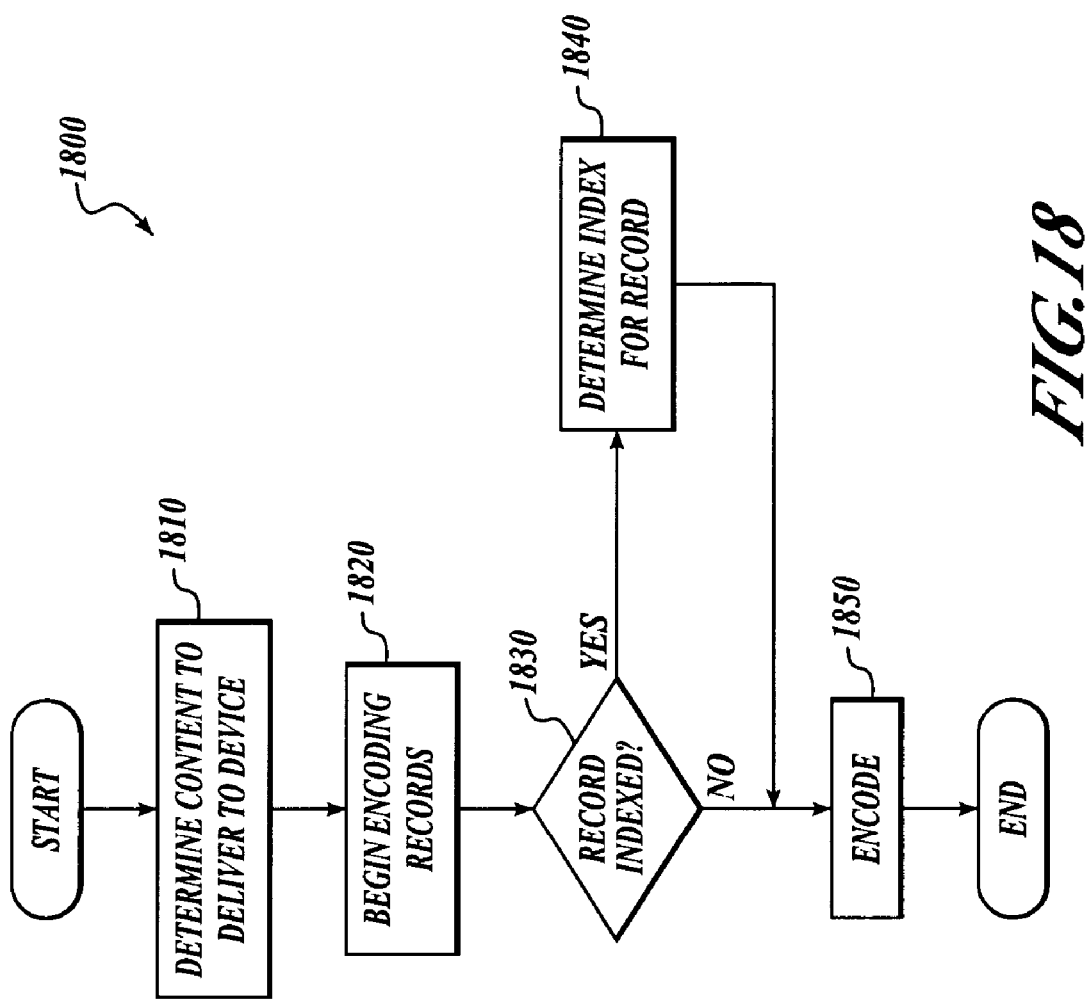
FIG. 18 illustrates encoding sports data, in accordance with aspects of the present invention.

FIG. 18 illustrates encoding sports data, in accordance with aspects of the invention. After a start block, the process moves to block 1810 where a determination is made as to what content is going to be delivered to the device.

Moving to block 1820, the content is divided into discrete records. Generally, records are based on each discrete data record that is going to be provided to the device. For example, the following is an exemplary set of pre-game data records: game title (index or characters), home team (generally indexed), away team (generally indexed); time of game (fixed size); date of game (fixed size); TV call letters (fixed size); and a game identifier (fixed size) that is unique to each game. The game identifier is used such that the same information does not need to be rebroadcast when future items are sent relating to the game (i.e. current game information and post-game information).

Transitioning to decision block 1830, a determination is made as to whether the data record is part of an index. Generally, any information that is static and that is broadcast multiple times is encoded as an index. For example, team information is generally encoded as part of an index, such that each team name does not need to be delivered to the device each time the name is referenced. Indexing the content dramatically cuts down the amount of data that needs to be broadcast. For example, for Division 1 football there are roughly 337 schools. Sending each school name each time would consume a large amount of bandwidth. The content is indexed by assigning an ID to each name that remains static. According to one embodiment, the index starts at one and ends at the last team. For example, assuming the NHL has thirty teams then five (5) bits are used to uniquely identify each team. The team names and their associated IDs are delivered to the device in a configuration message such that when the device receives a sports channel broadcast the device may associate the ID with the name.

When the record is encoded as an index, the process moves to block 1840, where the index value is determined for the record.

When the record is not encoded as an index, the process moves to block 1850, where the record is encoded. According to one embodiment, the value of the record is stored within a predetermined number of bits. For example, there are 16 games in professional football, so the maximum number of wins, losses or ties can not be greater than sixteen which equates to four bits for each field, or 12 bits total.

The following are example encodings for pre-game, current game, and post-game content. The encodings may be performed in other ways.

Pre-Game Encoding:
Game Title [Index available titles [5 bits]; Home Team [Index (5 bits for NHL)]; Away Team [Index (5 bits for NHL)]; Time [11 bits]; Date [9 bits]; TV call letters [4 chars]; and a Game Identifier [2 bytes].

Current Game Encoding:
Game ID[X bytes (obtained from pre-game broadcast)]; Home Team Score [X bits]; Away Team Score [X bits]; Time [X bits]; Period [X bits].

Scoring Encoding:
Scoring Summary [X bits].

Post-Game Encoding:
Game ID [X bytes]; Final Home Team Score [X bits]; Away Team Score [X bits]; Number of Overtimes [X bits].

Story Encoding:
Story [X chars]

Data Feed

The following is a list of exemplary data that may be obtained from a data feed for sporting events: teams/players, date, time and location of event; indication of which team is home and which is away; W-L Records for each of the teams; broadcast coverage call letters (e.g. ABC, ESPN); game title (i.e. Playoff game or Pro Bowl); series score; text description; national rankings; current score; game time (quarter, time (including "halftime" or "end of $1^{st}$ quarter", etc.); Scoring summary (quarter, time, team, player scored, score type); scoring leaders; players in foul trouble, with # of fouls; teams win/loss/tie; place in league; and pre and post game stories.

For baseball, starting pitchers and their records; teams, scores, half-inning (including "bottom of the 3rd" or "rain delay", etc.) If double-header, indication of which game; Scoring summary, by inning (including team, relevant at-bats, who scored, etc.); Winning pitcher with new record, losing pitcher with new record, who got the Save with total number of saves; Home Runs by name with number of home runs on season.

For auto racing: preview/recap information; series, whether qualifier or real race; current pole sitter (for qualifier-in-progress); current leader (for real race); name, car number for leader (plus average lap speed for qualifier; plus lap number/total laps); other racers (plus car number) in order, with time behind leader; winner name; car number and total time; all other racers in finishing order with name, car number; and time behind leader; driver, points; and earnings.

For golf: tournament name; current round; current leader name; score; hole; all golfers with score, winner name, winning score; winning purse; money leaders, names, earnings; world rankings.

Operating Environment

FIG. 1 illustrates an example operating environment for the present invention. As illustrated, operating environment 100 includes wireless transmitter 120 that is responsible for delivering content to wireless devices. According to one embodiment, the wireless transmitter may include a cellular tower that is used to communicate with mobile devices, such as cell phones, notebooks, pocket PCs, long-distance communication links, and the like. According to another embodiment, the wireless transmitter may include an FM transceiver that broadcasts signals over communication channel 110 to the various electronic devices. The FM broadcast may be any number of types including but not limited to: a standard FM transmission, a sub-carrier FM transmission, or any other type of FM transmission as may be desired. Example electronic devices that have an FM receiver or transceiver may include a desktop computer, a watch, a portable computer, a wireless cellular telephone (cell phone), and a personal data assistant (PDA). The electronic devices are arranged to receive information from the wireless broadcast.

Some example electronic devices that may include an electronic system arranged to operate according to the interaction model are illustrated in FIG. 1. Each of the electronic systems receives messages/information over the communication channel.

According to one embodiment, each broadcast transmission corresponds to the transmission of one or more frames. Each frame may include multiple messages, where some messages are public broadcast (aka "global" or "shared" messages), while other messages are client specific messages (aka "personal" or "private" messages). Every client that is located within the designated service region may receive shared messages, while a single client may decode a private message.

Electronic devices (e.g., a wireless watch device) receive message packets according to shared and private messages that are directed to the client device. Message packets are organized in groups according to logical slot (or channel) entry numbers. For example, a particular electronic device is configured to receive a selected group of channels from the available channels. The message packets associated with each of those channels is received, processed, and stored in the client device. The stored message packets can be reviewed using a user interface that employs an interaction model, in accordance with the present invention.

Example channels include: a sports channel, a time channel, a messages channel, a calendar channel, a weather channel, a stocks channel, a news channel, and a movies channel. Messages associated with each channel include message content that is based on the particulars of the channel. For example, the sports channel may include results of games played involving teams the user in which the user desires to follow.

FIG. 2 is a schematic diagram illustrating functional components of an illustrative electronic device that may be used to interact with channel content, in accordance with aspects of the invention. Electronic device 200 includes processor 260, memory 262, display 228, and user interface 232. Memory 262 generally includes both volatile memory (e.g., RAM) and non-volatile memory (e.g., ROM, Flash Memory, or the like). Electronic device 200 may include an operating system 264, such as the Windows CE operating system from Microsoft Corporation or another operating system, which is resident in memory 262 and executes on processor 260. User interface 232 may be a series of push buttons, a scroll wheel, a numeric dialing pad (such as on a typical telephone), or another type of user interface means. Display 228 may be a liquid crystal display, or any other type of display commonly used in electronic devices. In one example, display 228 may be touch-sensitive that would act as an input device.

One or more application programs 266 are loaded into memory 262 and run on the device. Examples of application programs include sports programs, calendar programs, movie programs, time programs, and so forth. Electronic device 200 also includes non-volatile storage 268 that is located within memory 262. Non-volatile storage 268 may be used to store persistent information which should not be lost if electronic device 200 is powered down. Applications 266 may use and store information in storage 268, such as sports content used by a sports application, appointment information used by a calendar program, and the like.

Electronic device 200 includes power supply 270, which may be implemented as one or more batteries. Power supply 270 might further include an external power source, such as an AC adapter or a powered docking cradle that supplements or recharges the batteries.

Electronic device 200 is also shown with two types of external notification mechanisms: LED 240 and audio interface 274. These devices may be directly coupled to power supply 270 so that when activated, they remain on for a duration dictated by the notification mechanism even though processor 260 and other components might shut down to conserve battery power. LED 240 may be programmed to remain on indefinitely until the user takes action to indicate the powered-on status of the device. Audio interface 274 is used to provide audible signals to and receive audible signals from the user. For example, audio interface 274 may be coupled to a speaker for providing audible output and to a microphone for receiving audible input, such as to facilitate a telephone conversation, or as a user interface using voice recognition. In another example, a vibration device (not shown) can be used to give feedback to the user such as for alerting the user of a newly arrived content. Electronic device 200 can control each alert mechanism separately (e.g., audio, vibration, as well as visual cues).

Electronic device 200 also includes a communication connection, such as radio interface layer 272, which performs the function of receiving and/or transmitting radio frequency communications. Radio interface layer 272 facilitates wireless connectivity for electronic device 200. Transmissions to and from radio interface layer 272 are conducted under control of the operating system 264. In other words, communications received by radio interface layer 272 may be disseminated to application programs 266.

"Computer readable media" can be any available media that can be accessed by client/server devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by client/server devices. Communication media typically embodies computer readable instructions, data structures, program modules or other data in a modulated data signal such as a carrier wave or other transport mechanism and includes any information delivery media.

The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above are included within the scope of computer readable media.

In one example of the present invention, electronic device 200 is a mobile electronic device such as a watch device that includes a wireless interface. An exemplary watch device is shown in FIG. 3.

Broadcast Channels

Figure 4:
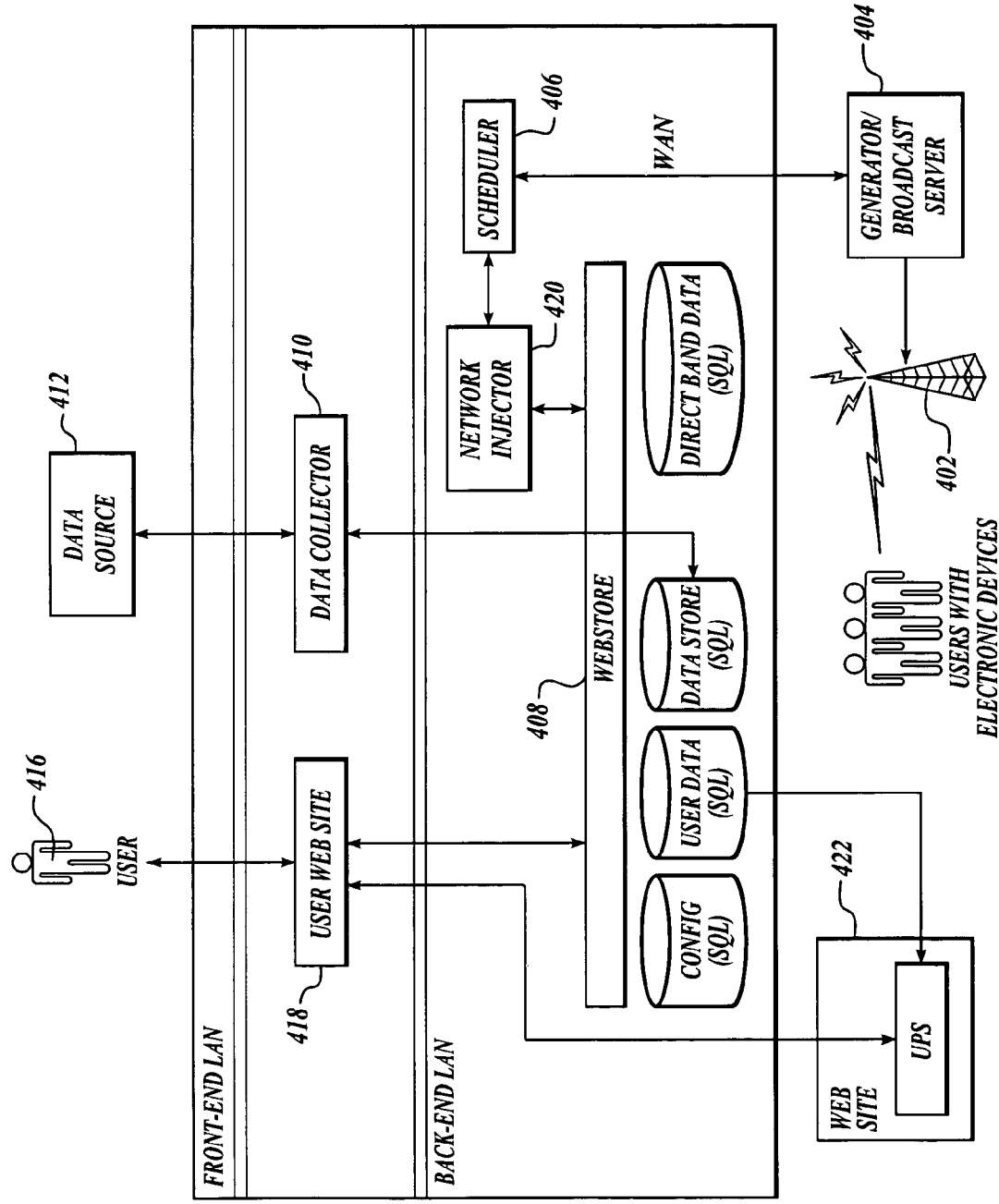
FIG. 4 illustrates a system for delivering and configuring channel information to an electronic device.

FIG. 4 illustrates a system for delivering and configuring channel information to an electronic device, in accordance with aspects of the invention.

A user, such as user 416, may customize their channels through user web site 418. Using website 418 the user may set options and select information associated with channels to which they have subscribed. For example, the user may select sports teams which are tracked on the electronic device. The selected options are stored in a data store, such as webstore 408. Channel information and various options may also be automatically retrieved from a web site to which the user participates in. For example, web site 422 may be the user's home page in which the user has already selected various options customizing their page. These options may be used to populate the options associated with various channels. For example, a user's selected cities may be used in a sports channel and a weather channel, the user's selected theaters may be used in a movies channel, a user's selected stocks they desire to track may be used in a stock channel, and the like.

Data Collector 410 is configured to collect data from one or more data sources, such as data source 412, relating to a channel. For example data collector 410 may retrieve baseball content from one data source, and football content from another data source. According to one embodiment, the data feed is obtained from Sportsticker.

The data obtained varies depending on the sport covered as well as the sports content that is delivered to the device. After the data is obtained, the data is encoded and then sent to the device. The data collected by data collector 410 may be stored in a data store, such as webstore 408, for later broadcast.

Broadcast transmitter tower 402 is arranged to provide a communication signal that is configured for reception by users with electronic devices that are located within a service region. Broadcast tower 402 transmits in response to generator/broadcast server 404. Generator 404 may communicate with scheduler 406 via a network communication link. Scheduler 406 is configured to schedule broadcast transmissions relating to channel information.

Selected services are entered in a database, such as webstore 408 for broadcast transmission at a later time. At the designated time (or time interval) scheduler 406 communicates with broadcast server 404 to begin a transmission sequence of data for the selected services. Broadcast server 404 converts the data to the appropriate format for transmission (i.e. an FM signal) and relays it to broadcast tower 402. In an alternative example, scheduler 406 communicates the selected services to the broadcast server. The broadcast server schedules the time interval for transmission of the selected service.

Each broadcast transmission corresponds to the transmission of one or more frames that are arranged in accordance with a frame protocol. Each frame may include multiple messages, where some messages are public broadcast (aka "global" or "shared" messages), while other messages are client specific messages (aka "personal" or "private" messages). Each frame includes a table of contents that indicates the extent of messages that are found within the next transmitted frame. Every client that is located within the designated service region receives the shared and personal messages. Personal messages, however, may only be decoded by a single client.

Each frame includes a header, a table of contents, and a message payload that includes the content for one or more selected services as previously described. The header also includes other information such as authentication data, identified service region, language, available stations for the identified service region, frame number, and time stamp. Control information may also be included in one of the headers to indicate broadcast conditions such as a change in available channels, an assignment of a service region to a particular wireless client device, and an assignment of a particular channel (frequency). In one example, each frame includes a change counter in one of the headers to indicate a change has taken place in the system. Wireless client devices (clients) may use the change counter to determine when to initiate a failover (when a broadcast tower becomes unavailable).

Client devices can determine the current service region based on information that is included in the broadcast transmissions. The time zone can be determined based on the current service region such that the client device can adjust any time related information. Moreover, the time and date functions of the client device may be synchronized based on information that is included in the broadcast transmissions.

Sports team names change fairly rarely and therefore may be sent by broadcast server 404 as part of the configuration of the sports channel on the electronic device. The electronic device stores the name and corresponding ID of the name such that when it receives a sports broadcast transmission the device may match the ID with the name of the team/player. According to one embodiment, a stream of team names is broadcast at predetermined intervals. When a device needs a team name, the team name is accessed within the stream by an index value. According to another embodiment, whenever a team name changes a configuration message is prepared and sent to users who have selected that team.

According to one embodiment, standings information is broadcast in one stream with game information broadcast on a separate stream. This helps to save bandwidth by avoiding broadcasting standings information (relatively costly) multiple times.

Updates to Device

Generally, updates are sent throughout the sporting event. For some events, the updates are sent each time a team scores. For other events, the updates may be sent according to a predetermined schedule. For example, every five minutes until near the end of the game and then every two minutes. The updates may also be sent each quarter/period/hole/lap completed.

Pre-game summaries are broadcast approximately once an hour in the days leading up to the game. They are broadcast more frequently the day before and the day of the game.

On the day of and the day after the game, post game content is broadcast approximately twice an hour but more frequently in the hours immediately following the game.

On the day before and the day after games, standings are broadcast at approximately once an hour. On the day of the game standings are broadcast 2 times per hour. Standings are assigned a higher priority for broadcast during the very early hours of the morning, such as from 3-4 AM EST. By this time, the games have finished and there has been time to recompute the standings. The standings are also broadcast throughout the day.

The device can also receive data and determine how long the data is valid. For example, the device could receive sport pre-game data on a Monday morning and know that the data is valid until game time. This information may be included in the application on the device, or encoded in the data sent to the device. This helps the device save resources by not having to repeatedly download the same data.

Process Flow

Figure 5A:
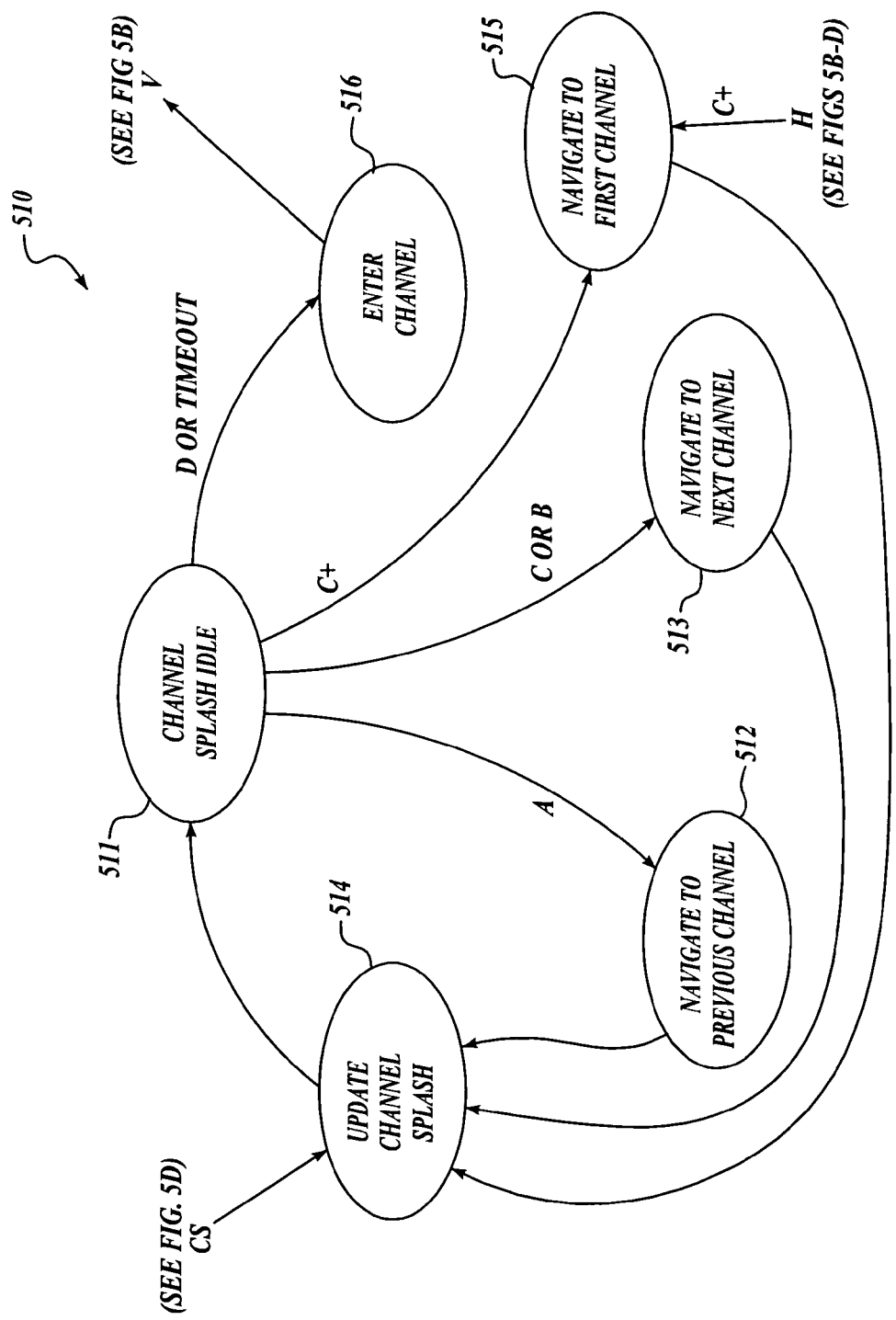
FIGS. 5A-5D illustrate process flows for passive and active navigation functions of a electronic device.
Figure 5B:
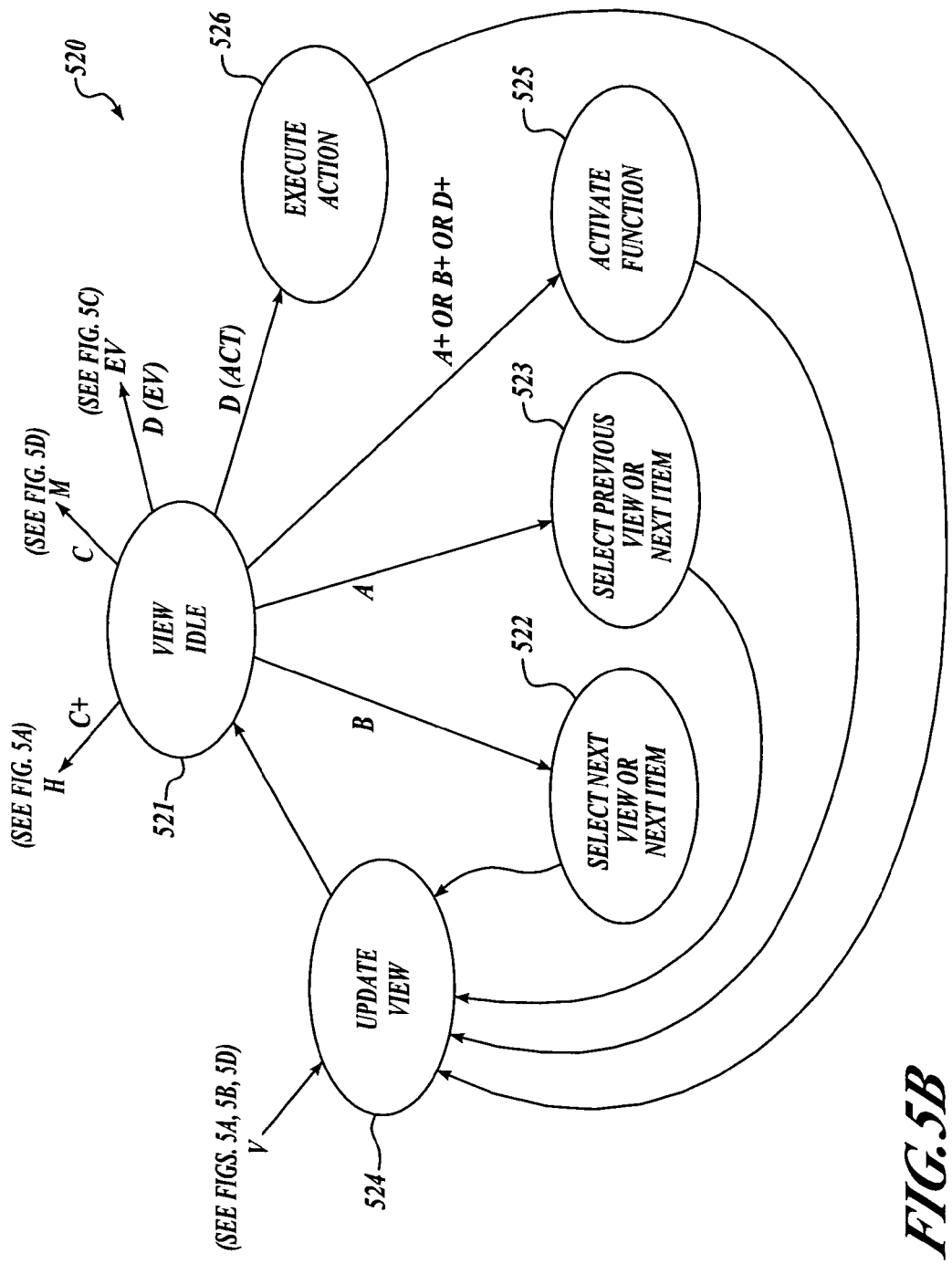
Figure 5C:
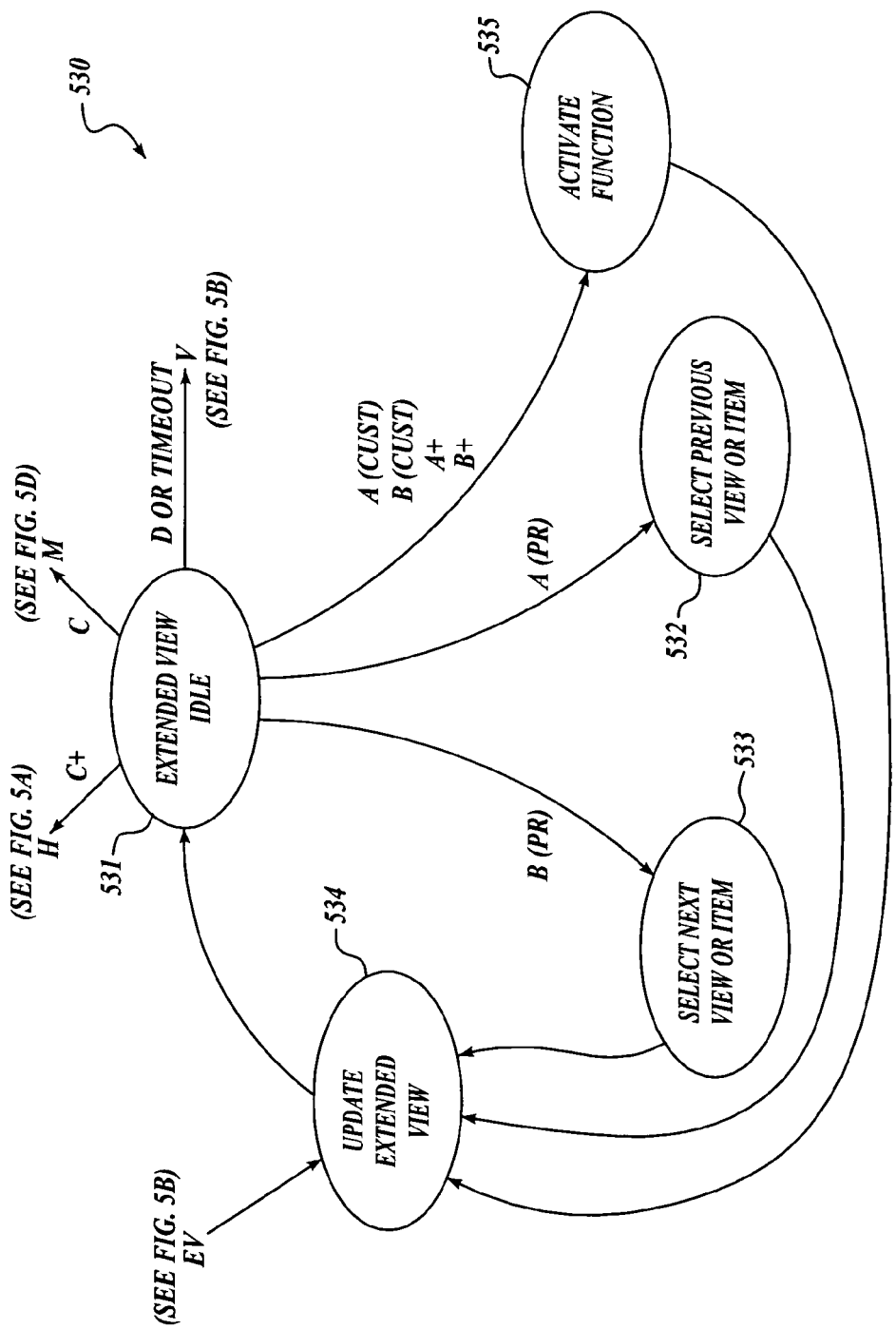
Figure 5D:
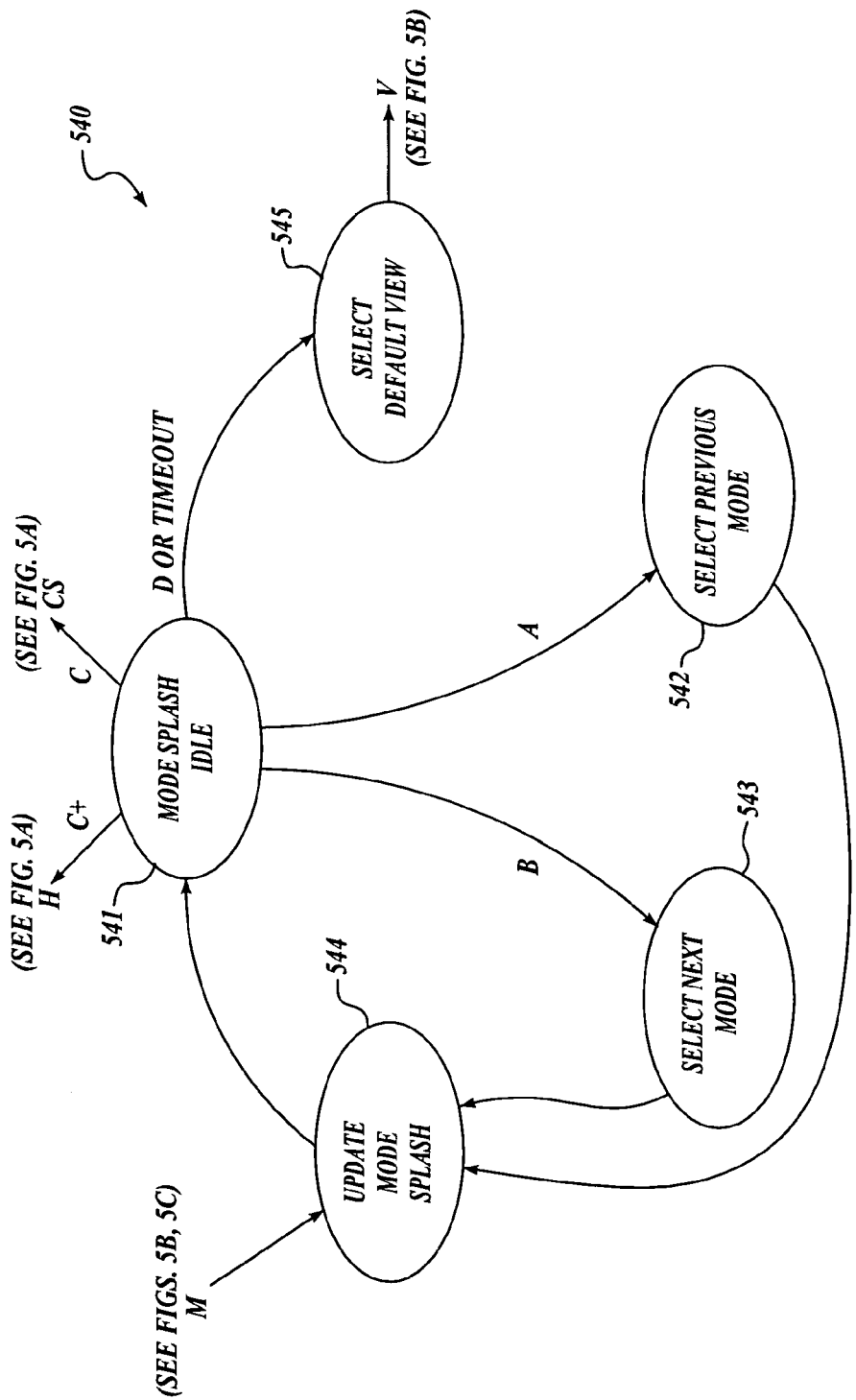

Process flow diagrams for navigation function of an example electronic device are illustrated in FIGS. 5A-5D. The process flow diagram illustrated in FIG. 5A is predominately focused on channel splash activity. The process flow diagram illustrated in FIG. 5B is predominately focused on view activity. The process flow diagram illustrated in FIG. 5C is predominately focused on extended view activity. The process flow diagram illustrated in FIG. 5D is predominately focused on mode splash activity.

Every electronic device has at least one channel that corresponds to the home channel. For a watch type of device, the home channel corresponds to a time channel. However, different home channels can be assigned to every electronic device. Whenever the currently selected channel corresponds to the home channel, the previous channel corresponds to the last channel (if more than one channel exists on the device). Similarly, the next channel corresponds to the home channel when the current channel is the last channel in the channel list for the electronic device.

Every electronic device has a set of selectors (or buttons) that are selectively activated to navigate various functions in the device. Example selectors are illustrated in FIG. 3. For the purposes of the discussion below, each selector is indicated by a letter such as "A", "B", "C", "D", and "E". Some alternate selector functions may be chosen by sustained activation of a selector button for a predetermined time interval (e.g., two seconds). The alternate selector functions are generally indicated in the figures by a "+" symbol that is adjacent to the selector functions' designating letter (e.g., "C+").

The example electronic device described below includes at least four selectors as indicated by letters "A", "B", "C", and "D". The "E" selector may be arranged to provide additional functions such as backlighting, a back channel selector, as well as any other desired function. Additional extended functions may also be programmed and accessible through multiple selector combinations. For example, one function could be selected by holding the "D" and "A" selectors together ("D+" & "A+") for a predetermined time interval. Additional extended functions can also be programmed using other selector combinations such as "D+" & "B+", "A+" & "B+", as well as others.

Channel Splash Operating State

The channel splash operating state is described as follows below with reference to FIG. 5A.

The electronic device has a default initial channel that is referred to as a home channel. The display is updated to indicate the currently selected channel at block 514. Processing continues to block 511 where the channel splash operating state is maintained in an idle state. The electronic system in the electronic device monitors the user interface (e.g., the four selectors) while in the channel splash IDLE state. Processing leaves the channel splash IDLE state when the user activates one or more of the selectors or a timeout has occurred. The display actively maintains the splash screen to indicate the current channel selection while the channel splash IDLE state is active at block 511. Splash screens may include one or more graphic elements and/or text elements. An example channel splash screen for a sports channel is illustrated in FIG. 7. Splash screens may be accompanied by the activation of sound that provides an audible indicator that the channel has changed. The sound associated with the audible indicators may be the same for each channel splash screen, or unique based on either the particular channel or the particular channel type (e.g., news channels are one type, while messages are another type).

Processing flows from channel splash IDLE state 511 to the "navigate up" or "navigate to previous channel" function 512 when the "A" selector is activated. Processing continues from block 512 to block 514, where the display is updated based on the newly selected channel. After the display is updated, processing returns to channel splash IDLE state 511.

Processing flows from channel splash IDLE state 511 to the "navigate down" or "navigate to next channel" function 513 when either the "B" selector or the "C" selector is activated. Processing continues from block 513 to block 514, where the display is updated based on the newly selected channel. After the display is updated, processing again returns to channel splash IDLE state 511.

Processing flows from channel splash IDLE state 511 to the "navigate to first channel" or "navigate to home channel" function 515 when the "C+" selector is activated. The home channel navigation function can be accessed from any channel of the electronic device. The electronic device navigates to the home channel (e.g., the time channel on a watch device) when the "navigate to home channel" function is activated. Processing continues from block 513 to block 514, where the display is updated based on the newly selected channel (i.e., the home channel). After the display is updated, processing again returns to channel splash IDLE state 511.

Processing flows from the channel splash IDLE state 511 to the "enter channel" function 516 when the "D" selector is activated. Alternatively, the "enter channel" function is activated when the electronic system is maintained in the channel splash IDLE state for a predetermined time interval (e.g., a 2 second timeout) without activation of a selector.

Processing flows from block 516 to block 524 (see FIG. 5B) when the "enter channel" function is activated as indicated by "V".

The enter channel function performs a series of initializations in the electronic device prior to leaving the channel splash operating state and entering the channel view operating state. Every channel in the electronic device has at least one operating mode. The electronic device selects the current operating mode as a default mode, and a current view as a default view in the currently selected channel when the "enter channel" function is activated.

In one example, a sports channel has a games mode, a standings mode, and a news mode. Multiple views may be associated with each operating mode.

Channel View Operating State

The channel view operating state is described as follows below with reference to FIG. 5B.

The electronic device enters the channel view operating state at entry point V, where the selector functions associated with the currently selected channel and operating mode are mapped to the selectors. The display is updated to indicate the currently selected view at block 524. Processing continues to block 521 where the channel view operating state is maintained in an IDLE state. The electronic system in the electronic device monitors the user interface (e.g., the four selectors) while in the view IDLE state. When the user activates one or more of the four selectors, processing leaves the view IDLE state.

The display actively maintains the current view while the view IDLE state is active at block 521. List type views include lists of items that can be selected. Other types of views are simply graphical and/or textual elements that are arranged in a display view. Views may be accompanied by the activation of sound that provides an audible indicator that the view has changed. The sound associated with the audible indicators may be the same for each view (e.g., a beep type of indicator or sound clip), or unique based on the particular view. In one example, an audible indicator is activated when a particular alert notification function is activated.

Processing flows from the view IDLE state 521 to the "previous view" or "previous item" function 522 when the "A" button selector is activated. Processing continues from block 522 to block 524, where the display is updated based on the newly selected view. After the display is updated, processing returns to view IDLE state 521. In one example, the previous view corresponds to the last view when the currently selected view is the first available view in the current mode for the current channel. In another example, the previous view corresponds to an empty view (e.g., "no sports", "no data", etc.) when the currently selected view is the first available view in the current mode for the current channel. In still another example, the previous item in a list is highlighted when the "A" selector is activated.

Processing flows from view IDLE state 521 to the "next view" or "next item" function 513 when the "B" selector is activated. Processing continues from block 523 to block 524, where the display is updated based on the newly selected view. After the display is updated, processing again returns to view IDLE state 521. In one example, the next view corresponds to the first view when the currently selected view is the last available view in the current mode for the current channel. In another example, the next view corresponds to an empty view when the currently selected view is the last available view in the current mode for the current channel. In still another example, the next item in a list is highlighted when the "B" selector is activated.

Processing flows from view IDLE state 521 to the "mode splash" function when the "C" selector (e.g., "mode select") is activated as indicated by "M". Refer to FIG. 5D and related discussion for details.

Processing flows from view IDLE state 521 to the select home channel splash function when the "C+" selector is activated as indicated by "H". Refer to FIG. 5A and related discussion for details.

The "D" selector is defined within the context of the current channel, mode, and view. The "D" selector may be defined as a "delete" function, and "enter extended view" function, a "select" function, or an "execute action" function. Not every view in a given channel/mode has an extended view as may be indicated by a null value. Some views may have an action function that is defined within the context of the view in the currently selected mode/channel. The context for each view is assigned to the mode upon entry into the mode for the current channel.

Processing flows from the view IDLE state 521 to the "enter extended view" function when the "D" selector is activated and the extended view is available as indicated by "D(EV)". The extended view is available when defined within the context of the currently selected view. For example, the extended view may be available for a list type view such that the highlighted list item is selected when the view "D" selector is activated, and a detailed view associated with the highlighted item is displayed as an extended view. Refer to FIG. 5C and related discussion for details on the extended view processing.

Processing flows from view IDLE state 521 to the "execute action" function at block 526 when the "D" selector is activated and the action function is available as indicated by "D(ACT)". The action function is defined within the context of the currently selected view. For example, a fortune cookie mode may be available in an entertainment channel. Although the fortune cookie mode may only have a single view, the "D" selector may be mapped to an action function that randomly selects fortunes from a list when the "D" selector is activated. After the action is performed (e.g., retrieve random fortune from list, execute an animation sequence), processing continues to block 524 where the display is updated as previously described.

Other special functions may be mapped to the "A+", "B+", and "D+" selectors within the context of the current view. By activating the corresponding selector for a predetermined time interval (e.g., 2 seconds) the corresponding special function is activated as indicated by block 525. Processing continues from block 525 to block 524 where the display is updated as previously described.

In one example, a list browser function is available in a mode that corresponds to sports stories. For this example, activation of the "A" and "B" selectors result in manual navigation through views that correspond to previous or subsequent stories. Activation of the "A+" or "B+" selector may activate a speed browse function.

In another example, a delete function is available in a view that corresponds to a specific story associated with the sports channel. Activation of the "D+" selector may activate a delete function that removes the currently selected story from the electronic device.

In still another example, processing may flow from view IDLE state 521 to an "alternate view" function when the electronic system is maintained in the channel splash IDLE state for a predetermined time interval (e.g., a 2 second timeout) without activation of a selector. For example, no action for a predetermined amount of time may result in views associated with the channel automatically rotating to other views associated with the channel.

Extended View Operating State

The extended view operating state is described as follows below with reference to FIG. 5C.

The electronic device enters the extended view operating state at entry point EV, where the selector functions associated with the currently selected extended view are mapped to the selectors. The display is updated to indicate the currently selected extended view at block 534. Processing continues to block 531 where the extended view operating state is maintained in an IDLE state. The electronic system in the electronic device monitors the user interface (e.g., the four selectors) while in the extended view IDLE state. When the user activates one or more of the four selectors, processing leaves the extended view IDLE state.

The display actively maintains the current extended view while the extended view IDLE state is active at block 531. Extended views include graphical and/or textual elements that are arranged in a display view. Extended views may be accompanied by the activation of sound that provides an audible indicator that the extended view has changed. The sound associated with the audible indicators may be the same for each extended view (e.g., a beep type of indicator or sound clip), or unique based on the particular extended view.

Processing flows from extended view IDLE state 531 to the "previous view" or "previous item" function 532 when the "A" selector is activated. Processing continues from block 532 to block 534, where the display is updated based on the newly selected extended view. After the display is updated, processing returns to extended view IDLE state 531. In one example, the previous view corresponds to the last extended view when the currently selected extended view is the first available extended view for the current channel/mode. In another example, the previous extended view corresponds to an empty view (e.g., "no appointments", "no events", "no data", etc.) when the currently selected extended view is the first available extended view in the current channel/mode.

Processing flows from extended view IDLE state 531 to the "next view" or "next item" function 533 when the "B" selector is activated. Processing continues from block 533 to block 534, where the display is updated based on the newly selected extended view. After the display is updated, processing returns to the extended view IDLE state 531. In one example, the next view corresponds to the first extended view when the currently selected extended view is the last available extended view for the current channel/mode. In another example, the next extended view corresponds to an empty view (e.g., "no events", "no data", etc.) when the currently selected extended view is the last available extended view in the current channel/mode.

Processing flows from extended view IDLE state 531 to the "mode splash" function when the "C" selector (e.g., "mode select") is activated as indicated by "M". Refer to FIG. 5D and related discussion for details.

Processing flows from extended view IDLE state 531 to the view function when the "D" selector is activated as indicated by "V". In another example, processing flows from extended view IDLE state 531 to the view function when a timeout interval expires (e.g., 5 seconds). Refer to FIG. 5B and related discussion for details concerning the view functions.

Processing flows from extended view IDLE state 531 to the select home channel splash function when the "C+" selector is activated as indicated by "H". Refer to FIG. 5A and related discussion for details.

Special functions may be mapped to the "A'", "B'", "A+", and "B+" selectors within the context of the current view. By activating the corresponding selector for a predetermined time interval (e.g., a 2 second timeout interval) the corresponding special function is activated as indicated by block 535. Processing continues from block 535 to block 534 where the display is updated as previously described.

Mode Splash Operating State

The model splash operating state is described as follows below with reference to FIG. 5D.

The electronic device enters the mode splash operating state at entry point M. The display is updated to indicate the currently selected mode at block 545. Processing continues to block 541 where the mode splash operating state is maintained in an IDLE state. The electronic system in the electronic device monitors the user interface (e.g., the four selectors) while in the mode splash IDLE state. When the user activates one or more of the four selectors, processing leaves the mode splash IDLE state.

The display actively maintains the current mode splash display while the mode splash view IDLE state is active at block 541. Mode splash views include graphical and/or textual elements that are arranged in a display view.

Example mode splash displays for a sports channel are illustrated in FIG. 7. Mode splash displays may be accompanied by the activation of sound that provides an audible indicator that the selected mode has changed. The sound associated with the audible indicators may be the same for each mode splash (e.g., a beep type of indicator or sound clip), or unique based on the particular mode selected.

Processing flows from mode splash IDLE state 541 to the "previous mode" function 542 when the "A" selector is activated. Processing continues from block 542 to block 544, where the display is updated based on the newly selected mode. After the display is updated, processing returns to mode splash IDLE state 541. In one example, the previous mode corresponds to the last mode when the currently selected mode is the first available mode for the current channel.

Processing flows from mode splash IDLE state 541 to the "next mode" function 543 when the "B" selector is activated. Processing continues from block 543 to block 544, where the display is updated based on the newly selected mode. After the display is updated, processing returns to mode splash IDLE state 541. In one example, the next mode corresponds to the first mode when the currently selected mode is the last available mode for the current channel.

Processing flows from mode splash IDLE state 541 to the "channel splash" function when the "C" selector (e.g., "channel select") is activated as indicated by "CS." Refer to FIG. 5A and related discussion for details.

Processing flows from mode splash IDLE state 541 to the "select default view" function 545 when the "D" selector is activated. Alternatively, processing may flow from mode splash IDLE state 541 to the "select default view" function 545 when a timeout interval (e.g., a 2 second interval) has expired. Processing continues from block 545 to the channel view operating state as indicated by "V". Refer to FIG. 5B and related discussion for details.

Processing flows from mode splash IDLE state 541 to the select home channel splash function when the "C+" selector is activated as indicated by "H". Refer to FIG. 5A and related discussion for details.

Example Display Screen Partitions

Figure 6:
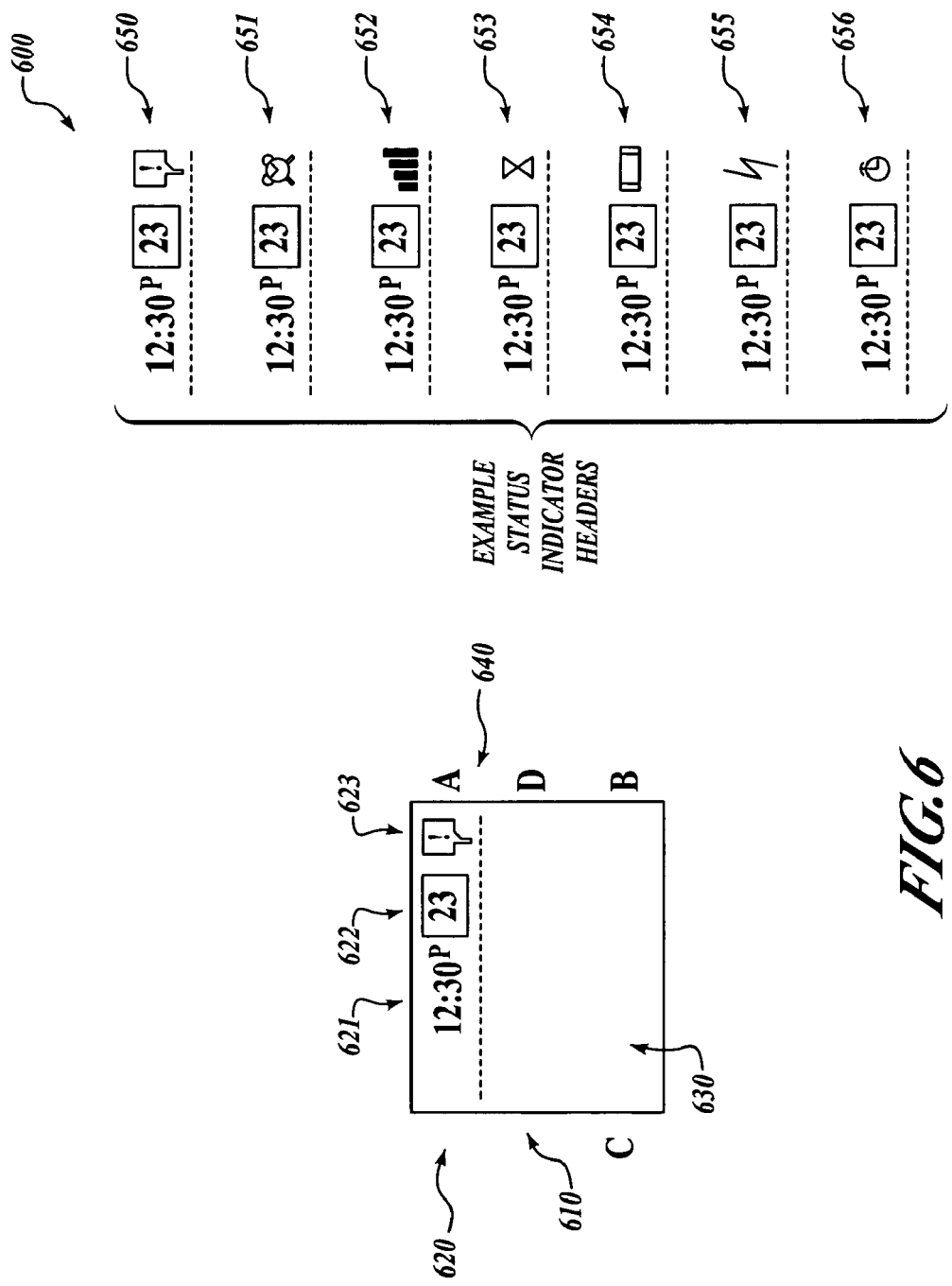
FIG. 6 shows exemplary status indicator headers.

FIG. 6 shows exemplary status indicator headers, in accordance with aspects of the present invention. Example display screen 610 is partitioned into two regions: header region 620 and main body region 630.

Main body region 630 of display screen 610 may include one or more graphical and/or textual information fields that change based on the current context in the current channel, mode, and operating state. In one example context, main body region 630 is a single region for displaying textual information, such as textual information 612. In another example context, main body section 610 may include a graphical representation.

Header region 620 of display screen 610 may include one or more graphical and/or textual information fields that change based on the current context in the current channel, mode, and operating state. In one example context, header region 620 may include two regions: current time field 621 and current date field 622. In another example context, header region 620 may include three regions: current time field 621, current date field 622, and status indicator field 623. In still another example context, header region 620 may include information relating to the channel. For example, the name of a team or player may be displayed in header region 620.

Status indicators may be associated with various conditions such as alerts in the electronic device. Example header 650 includes a status indicator for an internal alert such as an exclamation point symbol. Example header 651 includes a status indicator that an alarm is set such as an alarm clock symbol. Example header 652 includes a status indicator of signal strength in a wireless connection such as signal strength bars. Example header 653 includes a status indicator that a timer is running such as an hourglass symbol. Example header 654 includes a status indicator that the battery is low such as an empty battery symbol. Example header 655 includes a status indicator that the battery is charging such as a lightning bolt symbol. Example header 656 includes a status indicator that a timer is running such as a chronograph symbol. Other headers may also be used.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for receiving, displaying and interacting with sports channel content associated with a sports channel on a mobile electronic device, comprising:

receiving the sports channel content encoded on a communication signal that is broadcast to many electronic devices; wherein the sports channel content is received as records;

storing a portion of the sports channel content on the electronic device; wherein storing the portion of the sports channel content includes storing pre-game content for at least one day prior to an event; removing the pre-game information when the event starts; storing live event information during the event; and storing post-game information after the event is completed;

associating the sports channel content with a sports channel application on the electronic device;

decoding the received records using the sports channel application; wherein decoding the received records includes associating an index value with an expanded name when one of the records is encoded as an index; wherein the expanded name is displayed on a display when selected;

setting a current view associated with the sports channel; and displaying the current view on the display of the electronic device; wherein displaying the current view includes displaying a graphic and sports content that relates to the current view.

2. The method of claim 1, wherein setting the current view further comprises setting the current view to at least one of: a list of sporting events; a list of standings; and a list of news stories on the device.

3. The method of claim 1, wherein setting the current view associated with the sports channel, further comprises selecting a mode associated with the sports channel, wherein the mode is selected from at least one of: a games mode; a standings mode; and a news mode.

4. The method of claim 3, further comprising setting the current view to: a list of sporting events when the sports mode is selected; standings information when the standings mode is selected; and a list of sports stories when the news mode is selected.

5. The method of claim 3, further comprising receiving an input indicating a selection associated with one of the modes; and in response to the selection setting the current view.

6. The method of claim 2, further comprising determining when a sporting event is selected; and in response to the sporting event being selected showing details associated with the sporting event.

7. The method of claim 6, wherein showing details associated with the sporting event further comprises showing a current score and time of the sporting event.

8. The method of claim 5, further comprising receiving updates to the sports channel content during a sporting event.

9. The method of claim 1, further adjusting the current view based on user preferences.

10. An apparatus for receiving, navigating, and displaying sports content that is associated with a sports channel, comprising:

a data store;

a communication connection configured to receive a communication signal including the sports content that is directed to a plurality of mobile electronic devices and store the sports content in the data store; wherein storing the sports content includes storing pre-game content for at least one day prior to a sporting event; removing the pre-game information when the sporting event starts; storing live event information for the sporting event during the event; and storing post-game information for the sporting event after the event is completed; wherein the sports content is received as records;

a display;

a user interface that includes a selector; and an electronic system that is arranged to interact with the user interface, the data store, the communication connection, and the display, wherein the electronic system is configured to:

decode the received records; wherein decoding the received records includes associating an index value with an expanded name when one of the records is encoded as an index; wherein the expanded name is displayed on the display when selected;

select a current view from at least one of the set of views including: a game view; a standings view; and a news view; and display the current view on the display; wherein displaying the current view includes displaying a graphic and sports content that relates to the current view.

11. The apparatus of claim 10, wherein the electronic system is further configured to select a details view associated with the current view in response to the selector.

12. The apparatus of claim 10, wherein the game view includes statistics relating to a sporting event selected by a user.

13. The apparatus of claim 10, wherein the electronic system is further configured to activate a sporting events list in response to the interface selection device when a game mode is active, wherein the game list is organized as a list of sporting events, and wherein the selector is configured for selecting one of the sporting events in the list.

14. The apparatus of claim 10, wherein the electronic system is further configured to activate a news story list in response to the interface selection device when a news mode is active, wherein the news story list is organized as a list of stories, and wherein the selector is configured for selecting one of the stories in the list.

15. The apparatus of claim 13, wherein the electronic system is further configured to automatically receive the communication signal including the sports content that includes updates to a current sporting event.

16. The apparatus of claim 11, further comprising adjusting the sports content received by the device based on user preferences.

17. A system for providing and interacting with sports content associated with a sports channel, comprising:

a data collector configured to collect the sports content associated with the sports channel a broadcast device configured to transmit a communication signal including the sports content to a plurality of mobile electronic devices at the same time;

a mobile electronic device, having:

a data store;

a communication connection configured to receive the communication signal and store the sports content in the data store; wherein the sports content is received as records;

a display;

a user interface that includes a selector; and an electronic system that is arranged to interact with the communication connection, the user interface, the data store and the display, wherein the electronic system is configured to:

store a portion of the sports content on the electronic device; wherein storing the portion of the sports content includes storing pre-game content for a current sporting event at least one day prior to the current sporting event; removing the pre-game information when the current sporting event starts; storing live event information during the current sporting event; and storing post-game information after the current sporting event is completed;

decode the received records; wherein decoding the received records includes associating an index value with an expanded name when one of the records is encoded as an index; wherein the expanded name is displayed on the display when selected;

select a current view associated with the sports channel;

change the current view in response to the selector; and display the current view on the display, wherein displaying the current view includes displaying a graphic and sports content that relates to the current view.

18. The system of claim 17, wherein the sports content includes at least one of the following: current sporting events; standings; and sports news.

19. The system of claim 18, wherein the electronic system is further configured to a detailed view associated with at least one of: a selected sporting event, a selected team, and a selected player.

20. The system of claim 17, wherein the broadcast device is configured to broadcast an FM communication signal.

21. The system of claim 17, further comprising a server configured to receive user preferences associated with users receiving the sports channel; wherein the user preferences include preferences related to at least one of the following: sports teams and players.

22. The system of claim 17, wherein the broadcast device is further configured to send at least one ID associated with a team name as part of a configuration message.

* * * * *